(12) United States Patent
Zakaria et al.

(10) Patent No.: US 9,900,880 B1
(45) Date of Patent: Feb. 20, 2018

(54) MESH NETWORK CONFIGURATION TO CREATE SPATIAL SEPARATION BETWEEN SIMULTANEOUSLY OPERATED RADIOS

(71) Applicant: AMAZON TECHNOLOGIES, INC., Seattle, WA (US)

(72) Inventors: Omar Fawazhashim Zakaria, Santa Clara, CA (US); Cheol Su Kim, San Jose, CA (US); In Chul Hyun, San Jose, CA (US); Varadarajan Gopalakrishnan, Cupertino, CA (US)

(73) Assignee: Amazon Technologies, Inc., Seattle, WA (US)

( * ) Notice: Subject to any disclaimer, the term of this patent is extended or adjusted under 35 U.S.C. 154(b) by 78 days.

(21) Appl. No.: 15/154,657

(22) Filed: May 13, 2016

(51) Int. Cl.
| | | |
|---|---|---|
| *H04W 4/00* | (2009.01) | |
| *H04W 72/04* | (2009.01) | |
| *H04L 29/08* | (2006.01) | |
| *H04W 84/18* | (2009.01) | |

(52) U.S. Cl.
CPC ......... *H04W 72/042* (2013.01); *H04L 67/104* (2013.01); *H04W 84/18* (2013.01)

(58) Field of Classification Search
None
See application file for complete search history.

(56) References Cited

U.S. PATENT DOCUMENTS

| | | | | |
|---|---|---|---|---|
| 8,412,195 | B2* | 4/2013 | Yuk | H04W 88/06 370/310 |
| 8,594,027 | B2* | 11/2013 | Lee | H04W 16/14 370/315 |
| 2007/0025270 | A1* | 2/2007 | Sylvain | H04L 67/24 370/254 |
| 2009/0011770 | A1* | 1/2009 | Jung | H04L 5/0037 455/452.1 |
| 2012/0327913 | A1* | 12/2012 | Wang | H04W 72/1215 370/336 |
| 2014/0056276 | A1* | 2/2014 | Behnamfar | H04W 72/1257 370/330 |
| 2014/0177472 | A1* | 6/2014 | Halasz | H04W 28/021 370/255 |
| 2015/0382264 | A1* | 12/2015 | Cho | H04L 69/14 370/338 |
| 2016/0183282 | A1* | 6/2016 | Balaban | H04W 4/008 370/329 |
| 2016/0227416 | A1* | 8/2016 | Suzuki | H04W 72/0453 |
| 2016/0255643 | A1* | 9/2016 | Malik | H04W 72/1215 370/329 |
| 2016/0262169 | A1* | 9/2016 | Das | H04W 72/1215 |
| 2016/0295482 | A1* | 10/2016 | Belghoul | H04W 36/14 |
| 2016/0309340 | A1* | 10/2016 | Malach | H04L 5/001 |

(Continued)

*Primary Examiner* — Otis L Thompson, Jr.
(74) *Attorney, Agent, or Firm* — Lowenstein Sandler LLP

(57) ABSTRACT

Network hardware devices organized in a wireless mesh network (WMN) in which one network hardware devices includes three radios, two of which operate with a frequency separation less than 100 MHz. A first network hardware device communicates with a second network hardware device when not serving data to a client device. When serving data to a client device, the first network hardware device communicates wireless wide area network (WWAN) data to a WWAN network through a third network hardware device in the WMN that has its own WWAN connection to create spatial separation for simultaneous communication.

22 Claims, 9 Drawing Sheets

(56) References Cited

U.S. PATENT DOCUMENTS

| | | | |
|---|---|---|---|
| 2016/0316488 A1* | 10/2016 | Ko | H04W 76/048 |
| 2017/0041844 A1* | 2/2017 | Richards | H04W 40/244 |
| 2017/0041901 A1* | 2/2017 | Karaki | H04W 28/044 |
| 2017/0099338 A1* | 4/2017 | Yang | H04L 65/80 |
| 2017/0111931 A1* | 4/2017 | Damnjanovic | H04W 74/0825 |
| 2017/0155478 A1* | 6/2017 | So | H04L 1/1864 |
| 2017/0163293 A1* | 6/2017 | Lee | H04B 1/0057 |
| 2017/0238210 A1* | 8/2017 | Belghoul | H04W 28/08 370/331 |

* cited by examiner

MESH NETWORK CONFIGURATION TO CREATE SPATIAL SEPARATION BETWEEN SIMULTANEOUSLY OPERATED RADIOS

BACKGROUND

A large and growing population of users is enjoying entertainment through the consumption of digital media items, such as music, movies, images, electronic books, and so on. The users employ various electronic devices to consume such media items. Among these electronic devices (referred to herein as user devices or user equipment) are electronic book readers, cellular telephones, personal digital assistants (PDAs), portable media players, tablet computers, netbooks, laptops and the like. These electronic devices wirelessly communicate with a communications infrastructure to enable the consumption of the digital media items. In order to wirelessly communicate with other devices, these electronic devices include one or more antennas.

BRIEF DESCRIPTION OF DRAWINGS

The present inventions will be understood more fully from the detailed description given below and from the accompanying drawings of various embodiments of the present invention, which, however, should not be taken to limit the present invention to the specific embodiments, but are for explanation and understanding only.

DETAILED DESCRIPTION

Figure 1:
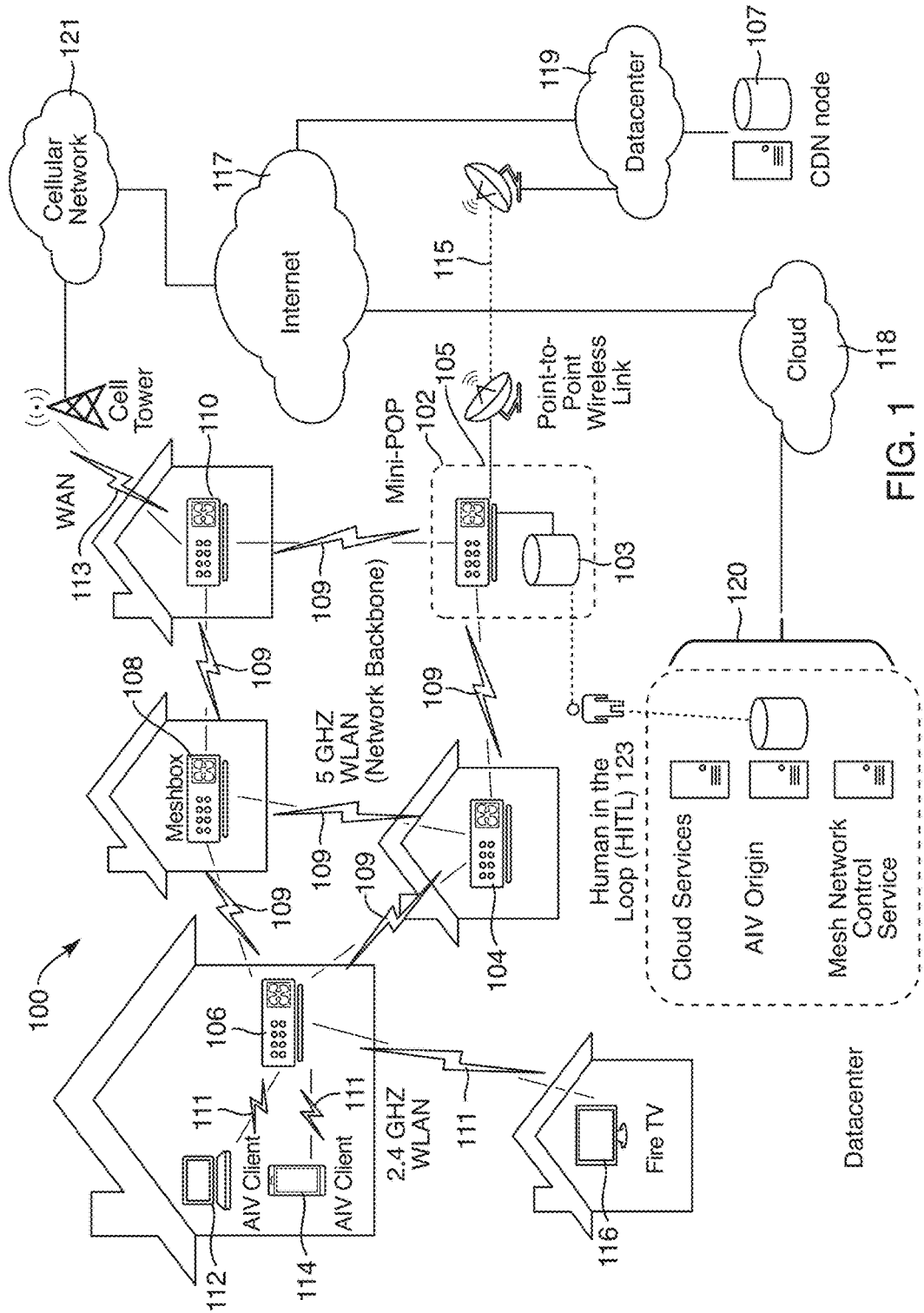
FIG. 1 is a network diagram of network hardware devices organized in a wireless mesh network (WMN) for content distribution to client devices in an environment of limited connectivity to broadband Internet infrastructure according to one embodiment.

A wireless mesh network (WMN) containing multiple mesh network devices, organized in a mesh topology, is described. The mesh network devices in the WMN cooperate in distribution of content files to client consumption devices in an environment of limited connectivity to broadband Internet infrastructure. The embodiments described herein may be implemented where there is the lack, or slow rollout, of suitable broadband Internet infrastructure in developing nations, for example. These mesh networks can be used in the interim before broadband Internet infrastructure becomes widely available in those developing nations.

Antenna-to-antenna isolations between antennas are limiting factor in consumer electronics devices design. In a multi-radio device, the size and industrial design is usually limited by the minimum antenna-to-antenna isolation requirements between the different radios in the device. This is especially important for the radios that uses close frequencies in simultaneous fashion. For example, a cellular radio operating on LTE band 7 (2.5 GHz) and a WLAN radio (e.g., radio using the Wi-Fi® technology) operating on 2.4 GHz band, there is a tradeoff between the size of the device and the operation mode that can support. For another example, a device may have a cellular radio operating on LTE band 40 (2.4 GHz) and a WLAN radio operating on 2.4 GHz band. In another example, a device may include a WLAN radio operating on the 2.4 GHz band and a PAN radio operating on the same 2.4 GHz band, such as a radio using the Bluetooth® technology. In these examples, the size of the device and the operational modes of communication are tradeoff requirements using conventional technologies. For example, there will be less isolation between the two radios that are housed in a smaller device than a larger device. The size of the device may cause the device to give up simultaneous operation of the two radios to avoid having the two radios corrupt each other's signal. This concept is called desensitization. Some conventional device designs sacrifice throughput and latency on both radios, having these two radios operate in time splitting fashion where each radio operates in independent time slots while the other radio is off. Phones and tablets that have a radio using the Wi-Fi® technology and a radio using the Bluetooth® technology, the operation of a cellular radio and the Wi-Fi® radio are controlled by a coexistence algorithm. The coexistence algorithm organizes the radios' activities to ensure time slicing between the radios' activities. The coexistence of these two radios' operations in conventional devices is at the expense of throughput and latency. If simultaneous operations of the two radios are a requirement, to meet the isolation requirement between the radios, a size of the industrial design of the device will be bigger than the conventional devices using time slicing. For example, a TV may be large enough for sufficient isolation between a cellular radio and a WLAN radio or between a WLAN radio and a PAN radio when the frequency separation is less than 100 MHz. Some access points can be large enough to allow physical separation for isolation to accommodate simultaneous operation of the two radios with minimum desensitization.

The embodiments described herein are direct to technologies to permit sufficient isolation between radios in electronic devices, regardless of the size by leveraging other mesh network devices in the WMN to create spatial frequency between the two types of communications within the two frequency ranges that are within 100 MHz separation. In some embodiments, the network hardware devices organized in a WMN in which one network hardware devices includes three radios, two of which operate with a frequency separation less than 100 MHz. For example, a wireless wide area network (WWAN) radio may operate in a first frequency range that is within 100 MHz of a wireless local area network (WLAN) radio operating in a second frequency range. A first network hardware device communicates with a second network hardware device when not serving data to a client device. When serving data to a client device, the first network hardware device communicates wireless wide area network (WWAN) data to a WWAN network through a third network hardware device in the WMN that has its own WWAN connection to create spatial separation for simultaneous communication.

One system of devices organized in a WMN includes a first network hardware device having at least one of a point-to-point wireless link to access content files over the Internet or a wired connection to access the content files stored on a storage device coupled to the first network hardware device. The network hardware devices are also referred to herein as mesh routers, mesh network devices, mesh nodes, Meshboxes, or Meshbox nodes. Multiple network hardware devices wirelessly are connected through a network backbone formed by multiple peer-to-peer (P2P) wireless connections (i.e., wireless connections between multiple pairs of the network hardware devices). The multiple network devices are wirelessly connected to one or more client consumption devices by node-to-client (N2C) wireless connections. The multiple network devices are wirelessly connected to a mesh network control service (MNCS) device by cellular connections. The content file (or generally a content item or object) may be any type of format of digital content, including, for example, electronic texts (e.g., eBooks, electronic magazines, digital newspapers, etc.), digital audio (e.g., music, audible books, etc.), digital video (e.g., movies, television, short clips, etc.), images (e.g., art, photographs, etc.), or multi-media content. The client consumption devices may include any type of content rendering devices such as electronic book readers, portable digital assistants, mobile phones, laptop computers, portable media players, tablet computers, cameras, video cameras, netbooks, notebooks, desktop computers, gaming consoles, DVD players, media centers, and the like.

The embodiments of the mesh network devices may be used to deliver content, such as video, music, literature, or the like, to users who do not have access to broadband Internet connections because the mesh network devices may be deployed in an environment of limited connectivity to broadband Internet infrastructure. In some of the embodiments described herein, the mesh network architecture does not include "gateway" nodes that are capable of forwarding broadband mesh traffic to the Internet. The mesh network architecture may include a limited number of point-of-presence (POP) nodes that do have access to the Internet, but the majority of mesh network devices is capable of forwarding broadband mesh traffic between the mesh network devices for delivering content to client consumption devices that would otherwise not have broadband connections to the Internet. Alternatively, instead of POP node having access to broadband Internet infrastructure, the POP node is coupled to storage devices that store the available content for the WMN. The WMN may be self-contained in the sense that content lives in, travels through, and is consumed by nodes in the mesh network. In some embodiments, the mesh network architecture includes a large number of mesh nodes, called Meshbox nodes. From a hardware perspective, the Meshbox node functions much like an enterprise-class router with the added capability of supporting P2P connections to form a network backbone of the WMN. From a software perspective, the Meshbox nodes provide much of the capability of a standard content distribution network (CDN), but in a localized manner. The WMN can be deployed in a geographical area in which broadband Internet is limited. The WMN can scale to support a geographic area based on the number of mesh network devices, and the corresponding distances for successful communications over WLAN channels by those mesh network devices.

Although various embodiments herein are directed to content delivery, such as for the Amazon Instant Video (AIV) service, the WMNs, and corresponding mesh network devices, can be used as a platform suitable for delivering high bandwidth content in any application where low latency is not critical or access patterns are predictable. The embodiments described herein are compatible with existing content delivery technologies, and may leverage architectural solutions, such as CDN surfaces like the Amazon AWS CloudFront service. Amazon CloudFront CDN is a global CDN service that integrates with other Amazon Web services products to distribute content to end users with low latency and high data transfer speeds. The embodiments described herein can be an extension to this global CDN, but in environments where there is limited broadband Internet infrastructure. The embodiments described herein may provide users in these environments with a content delivery experience equivalent to what the users would receive on a traditional broadband Internet connection. The embodiments described herein may be used to optimize deployment for traffic types (e.g. streaming video) that are increasingly becoming a significant percentage of broadband traffic and taxing existing infrastructure in a way that is not sustainable.

Figure 5:
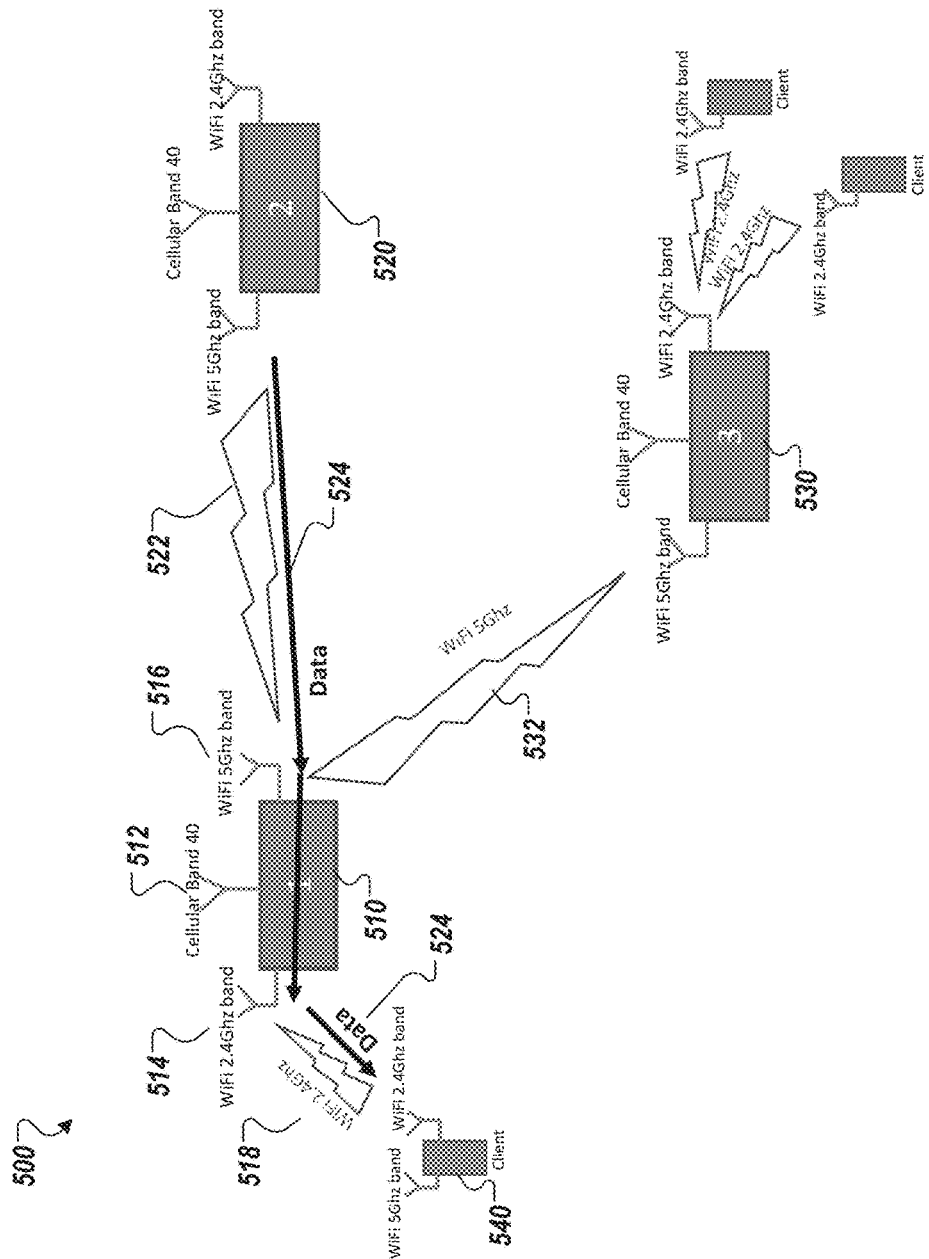
FIG. 5 is a network diagram of three mesh network devices in a WMN according to one implementation.
Figure 6:
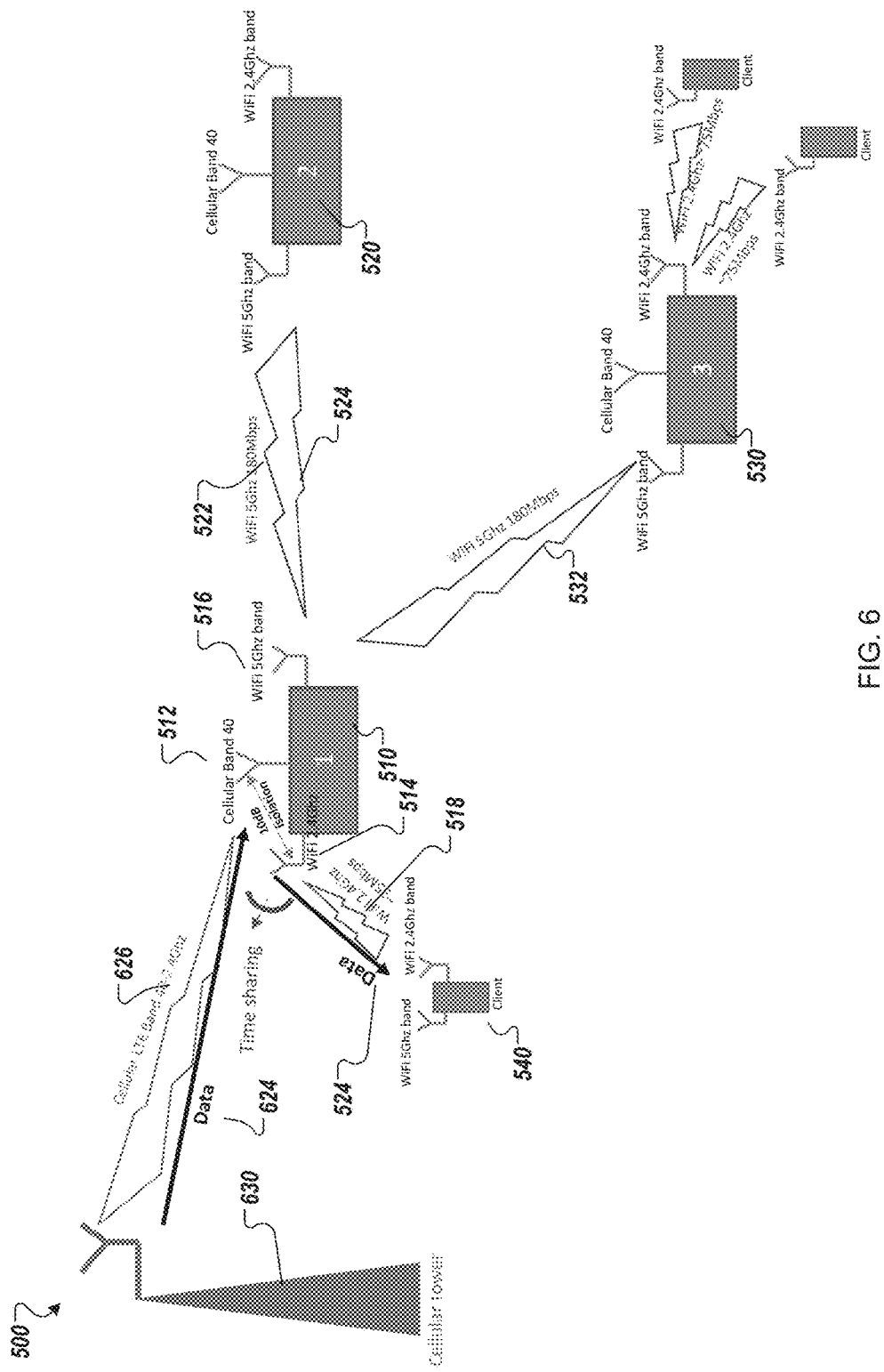
FIG. 6 is a network diagram of the three mesh network devices using time sharing access between LTE radio and a WLAN radio according to one implementation.
Figure 7:
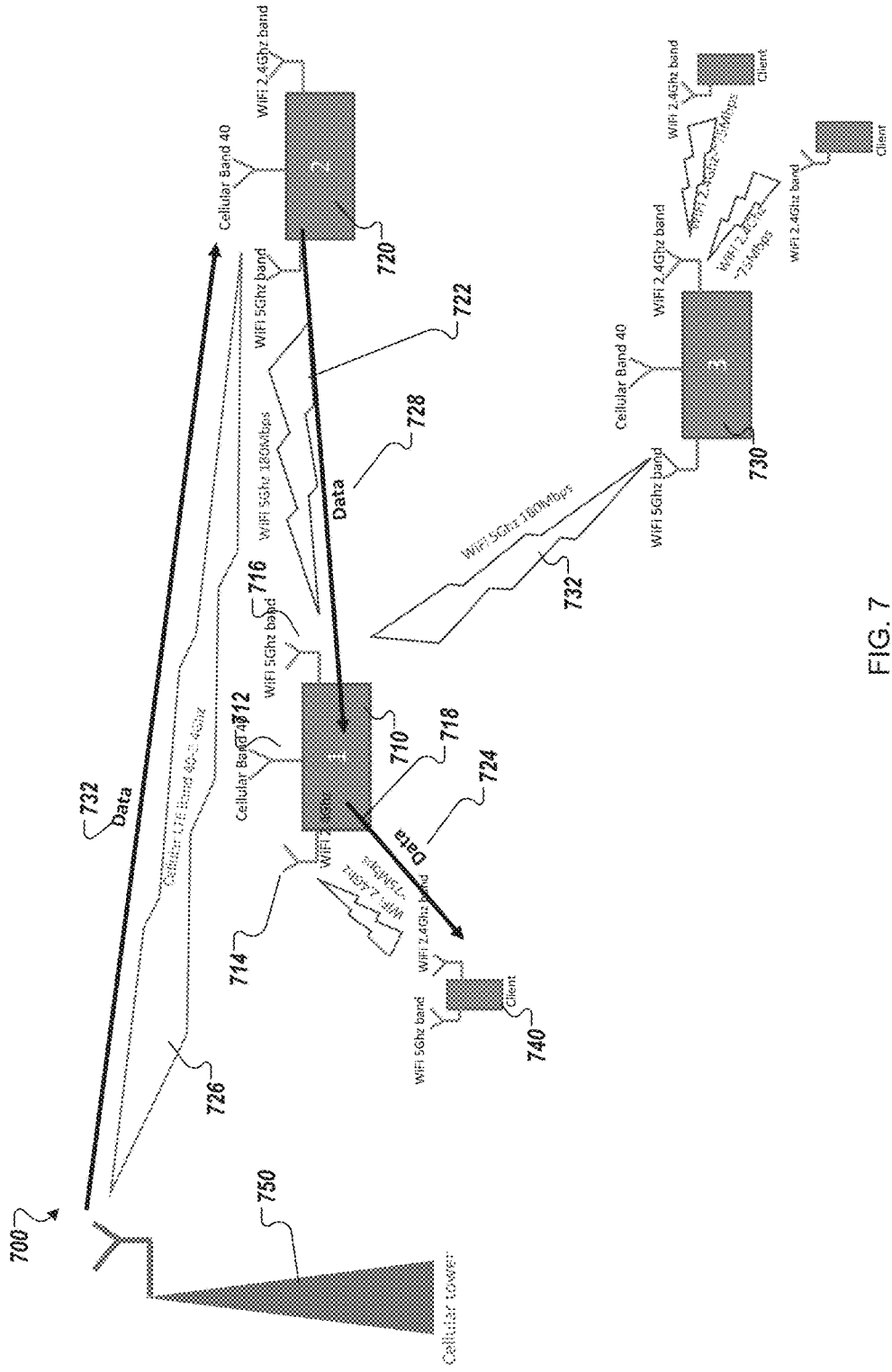
FIG. 7 is a network diagram of the three mesh network devices with embodiments to create spatial separation between the LTE radio and the WLAN radio by routing the data from a first mesh network device to a second mesh network device.
Figure 8:
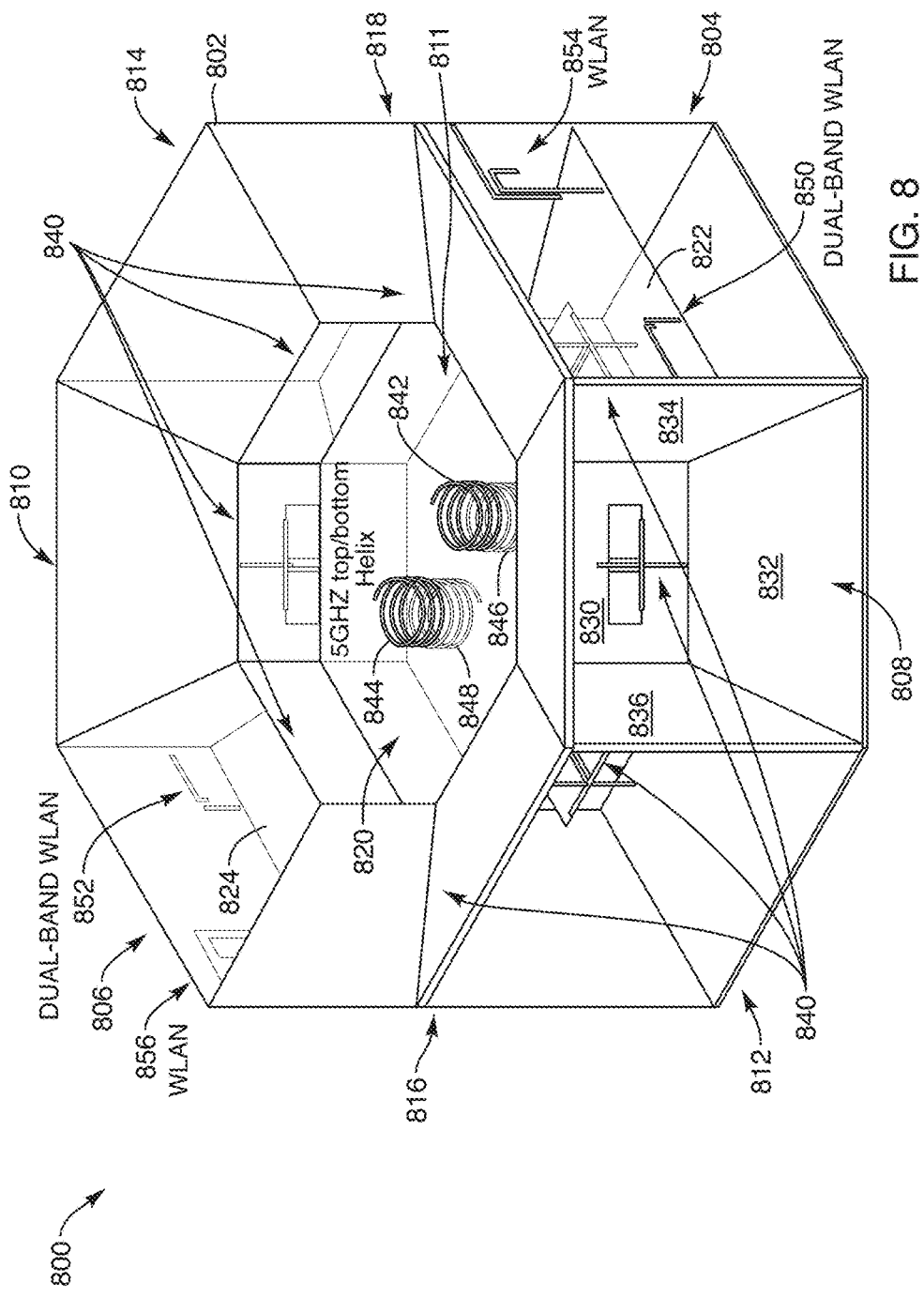
FIG. 8 illustrates a multi-radio, multi-channel (MRMC) network device according to one embodiment.
Figure 9:
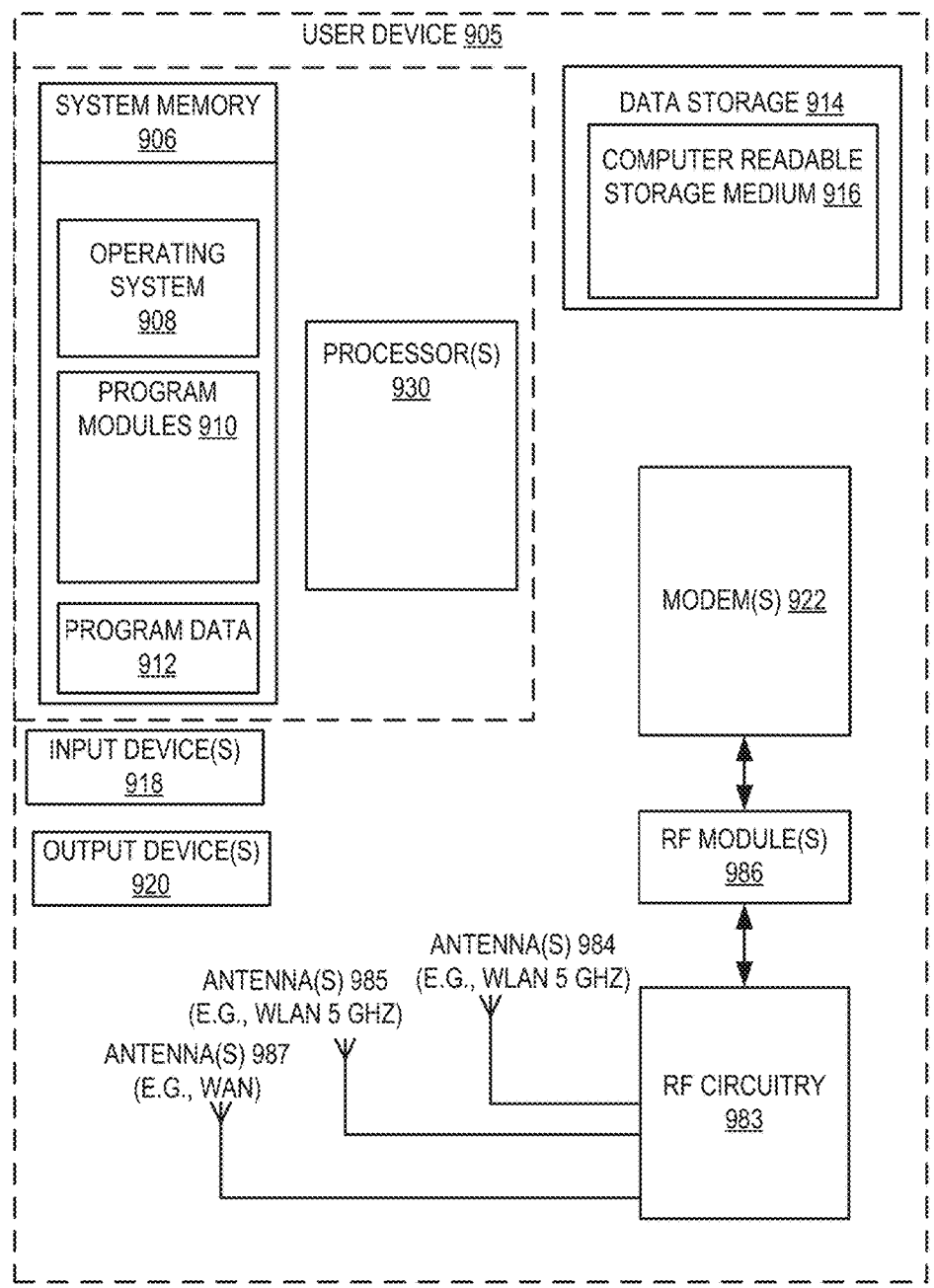
FIG. 9 is a block diagram of a network hardware device according to one embodiment.

FIGS. 1-4 are generally directed to network hardware devices, organized in a wireless mesh network, for content distribution to client consumption devices in environments of limited connectivity to broadband internet infrastructure. The embodiments described herein may be deployed in these network hardware devices. FIG. 5-7 are generally directed to mesh network configurations to create spatial separation between simultaneous operated radios according to various embodiments. FIGS. 8-9 are generally directed to multi-radio, multi-channel (MRMC) mesh network devices that may implement various embodiments described herein.

FIG. 1 is a network diagram of network hardware devices 102-110, organized in a wireless mesh network (WMN) 100, for content distribution to client devices in an environment of limited connectivity to broadband Internet infrastructure according to one embodiment. The WMN 100 includes multiple network hardware devices 102-110 that connect together to transfer digital content through the WMN 100 to be delivered to one or more client consumption devices connected to the WMN 100. In the depicted embodiment, the WMN 100 includes a miniature point-of-presence (mini-POP) device 102 (also referred to as mini-POP device), having at least one of a first wired connection to an attached storage device 103 or a point-to-point wireless connection 105 to a CDN device 107 (server of a CDN or a CDN node) of an Internet Service Provider (ISP). The CDN device 107 may be a POP device (also referred to as a POP device), an edge server, a content server device or another device of the CDN. The mini-POP device 102 may be similar to POP devices of a CDN in operation. However, the mini-POP device 102 is called a miniature to differentiate it from a POP device of a CDN given the nature of the mini-POP device 102 being a single ingress point to the WMN 100; whereas, the POP device of a CDN may be one of many in the CDN.

The point-to-point wireless connection 105 may be established over a point-to-point wireless link 115 between the mini-POP device 102 and the CDN device 107. Alternatively, the point-to-point wireless connection 105 may be established over a directional microwave link between the mini-POP device 102 and the CDN device 107. In other embodiments, the mini-POP device 102 is a single ingress node of the WMN 100 for the content files stored in the WMN 100. Meaning the mini-POP 102 may be the only node in the WMN 100 having access to the attached storage or a communication channel to retrieve content files stored outside of the WMN 100. In other embodiments, multiple mini-POP devices may be deployed in the WMN 100, but the number of mini-POP devices should be much smaller than a total number of network hardware devices in the WMN 100. Although a point-to-point wireless connection can be used, in other embodiments, other communication channels may be used. For example, a microwave communication channel may be used to exchange data. Other long distance communication channels may be used, such as a fiber-optic link, satellite link, cellular link, or the like. The network hardware devices of the WMN 100 may not have direct access to the mini-POP device 102, but can use one or more intervening nodes to get content from the mini-POP device. The intervening nodes may also cache content that can be accessed by other nodes. The network hardware devices may also determine a shortest possible route between the requesting node and a node where a particular content file is stored.

The CDN device 107 may be located at a datacenter 119 and may be connected to the Internet 117. The CDN device 107 may be one of many devices in the global CDN and may implement the Amazon CloudFront technology. The CDN device 107 and the datacenter 119 may be co-located with the equipment of the point-to-point wireless link 155. The point-to-point wireless connection 105 can be considered a broadband connection for the WMN 100. In some cases, the mini-POP device 102 does not have an Internet connection via the point-to-point wireless connection 105 and the content is stored only in the attached storage device 103 for a self-contained WMN 100.

The WMN 100 also includes multiple mesh nodes 104-110 (also referred to herein as meshbox nodes and network hardware devices). The mesh nodes 104-110 may establish multiple P2P wireless connections 109 between mesh nodes 104-110 to form a network backbone. It should be noted that only some of the possible P2P wireless connections 109 are shown between the mesh nodes 104-110 in FIG. 1. In particular, a first mesh node 104 is wirelessly coupled to the mini-POP device 102 via a first P2P wireless connection 109, as well as being wirelessly coupled to a second mesh node 106 via a second P2P wireless connection 109 and a third mesh node 108 via a third P2P wireless connection. The mesh nodes 104-110 (and the mini-POP device 102) are MRMC mesh network devices. As described herein, the mesh nodes 104-110 do not necessarily have reliable access to the CDN device 107. The mesh nodes 104-110 (and the mini-POP device 102) wirelessly communicate with other nodes via the network backbone via a first set of WLAN channels reserved for inter-node communications. The mesh nodes 102-110 communicate data with one another via the first set of WLAN channels at a first frequency of approximately 5 GHz (e.g., 5 GHz band of the Wi-Fi® network technologies).

Each of the mesh nodes 104-110 (and the mini-POP device 102) also includes multiple node-to-client (N2C) wireless connections 111 to wirelessly communicate with one or more client consumption devices via a second set of WLAN channels reserved for serving content files to client consumption devices connected to the WMN 100. In particular, the second mesh node 106 is wirelessly coupled to a first client consumption device 112 (AIV client) via a first N2C wireless connection 111, a second client consumption device 114 (AIV client) via a second N2C wireless connection 111, and a third client consumption device 116 (e.g., the Fire TV device) via a third N2C wireless connection 111. The second node 106 wirelessly communicates with the client consumption devices via the second set of WLAN channels at a second frequency of approximately 2.4 GHz (e.g., 2.4 GHz band of the Wi-Fi® network technologies).

Each of the mesh nodes 104-110 (and the mini-POP device 102) also includes a cellular connection 113 to wirelessly communicate control data between the respective node and a second device 118 hosting a mesh network control service described below. The cellular connection 113 may be a low bandwidth, high availability connection to the Internet 117 provided by a cellular network. The cellular connection 113 may have a lower bandwidth than the point-to-point wireless connection 105. There may be many uses for this connection including, health monitoring of the mesh nodes, collecting network statistics of the mesh nodes, configuring the mesh nodes, and providing client access to other services. In particular, the mesh node 110 connects to a cellular network 121 via the cellular connection 113. The cellular network 121 is coupled to the second device 118 via the Internet 117. The second device 118 may be one of a collection of devices organized as a cloud computing system that that hosts one or more services 120. The services 120 may include cloud services to control setup of the mesh nodes, the content delivery service (e.g., AIV origin), as well as other cloud services. The mesh network control service can be one or more cloud services. The cloud services can include a metric collector service, a health and status service, a link selection service, a channel selection service, a content request aggregation service, or the like. There may be APIs for each of these services. Although this cellular connection may provide access to the Internet 117, the amount of traffic that goes through this connection should be minimized, since it may be a relatively costly link. This cellular connection 113 may be used to communicate various control data to configure the mesh network for content delivery. In addition, the cellular connection 113 can provide a global view of the state of the WMN 100 remotely. Also, the cellular connection 113 may aid in the debugging and optimization of the WMN 100. In other embodiments, other low bandwidth services may also be offered through this link (e.g. email, shopping on Amazon.com, or the like).

Although only four mesh nodes 104-110 are illustrated in FIG. 1, the WMN 100 can use many mesh nodes, wireless connected together in a mesh network, to move content through the WMN 100. The 5 GHz WLAN channels are reserved for inter-node communications (i.e., the network backbone). Theoretically, there is no limit to the number of links a given Meshbox node can have to its neighbor nodes. However, practical considerations, including memory, routing complexity, physical radio resources, and link bandwidth requirements, may place a limit on the number of links maintained to neighboring mesh nodes. Meshbox nodes may function as traditional access points (APs) for devices running AIV client software. The 2.4 GHz WLAN channels are reserved for serving client consumption devices. The 2.4 GHz band may be chosen for serving clients because there is a wider device adoption and support for this band. Additionally, the bandwidth requirements for serving client consumption devices will be lower than that of the network backbone. The number of clients that each Meshbox node can support depends on a number of factors including memory, bandwidth requirements of the client, incoming bandwidth that the Meshbox node can support, and the like. For example, the Meshbox nodes provide coverage to users who subscribe to the content delivery service and consume that service through an AIV client on the client consumption devices (e.g., a mobile phone, a set top box, a tablet, or the like). It should be noted that there is a 1-to-many relationship between Meshbox nodes and households (not just between nodes and clients). This means the service can be provided without necessarily requiring a customer to have a Meshbox node located in their house, as illustrated in FIG. 1. As illustrated, the second mesh node 106 services two client consumption devices 112, 114 (e.g., AIV clients) located in a first house, as well as a third client consumption device 116 (e.g., the Fire TV client) located in a second house. The Meshbox nodes can be located in various structures, and there can be multiple Meshbox nodes in a single structure.

The WMN 100 may be used to address two main challenges: moving high bandwidth content to users and storing that content in the network itself. The first challenge may be addressed in hardware through the radio links between mesh nodes and the radio links between mesh nodes and client consumption devices, and in software by the routing protocols used to decide where to push traffic and link and channel management used to configure the WMN 100. The second challenge may be addressed by borrowing from the existing content distribution strategy employed by the content delivery services (e.g., AIV) using caches of content close to the user. The architecture to support content caching is known as a CDN. An example CDN implementation is the AWS CloudFront service. The AWS CloudFront service may include several point-of-presence (POP) racks that are co-located in datacenters that see a lot of customer traffic (for example an ISP), such as illustrated in datacenter 119 in FIG. 1. A POP rack has server devices to handle incoming client requests and storage devices to cache content for these requests. If the content is present in the POP rack, the content is served to the client consumption device from there. If it is not stored in the POP rack, a cache miss is triggered and the content is fetched from the next level of cache, culminating in the "origin," which is a central repository for all available content. In contrast, as illustrated in FIG. 1, the WMN 100 includes the mini-POP device 102 that is designed to handle smaller amounts of traffic than a typical POP rack. Architecturally, the mini-POP device 102 may be designed as a Meshbox node with storage attached (e.g. external hard disk). The mini-POP device 102 may function identically to a POP device with the exception of how cache misses are handled. Because of the lack of broadband Internet infrastructure, the mini-POP device 102 has no traditional Internet connection to the next level of cache. The following describes two different solutions for providing the next level of cache to the mini-POP device 102.

In one embodiment, the mini-POP device 102 is coupled to an existing CDN device 107 via a directional microwave link or other point-to-point wireless link 115. A directional microwave link is a fairly easy way to get a relatively high bandwidth connection between two points. However, line of sight is required which might not be possible with terrain or building constraints. In another embodiment, the mini-POP device 102 can operate with a human in the loop (HITL) to update the cache contents. HITL implies that a person will be tasked with manually swapping out the hard drives with a hard drives with the updated content or adding the content to the hard drive. This solution may be a relatively high bandwidth but extremely high latency solution and may only be suitable if the use cases allow longer times (e.g., hours) to service a cache miss.

The WMN 100 may be considered a multi-radio multi-channel (MRMC) mesh network. MRMC mesh networks are an evolution of traditional single radio WMNs and a leading contender for combatting the radio resource contention that has plagued single radio WMNs and prevents them from scaling to any significant size. The WMN 100 has multiple devices, each with multi-radio multi-channel (MRMC) radios. The multiple radios for P2P connections and N2C connections of the mesh network devices allow the WMN 100 to be scaled to a significant size, such as 10,000 mesh nodes. For example, unlike the conventional solutions that could not effectively scale, the embodiments described herein can be very large scale, such as a 100×100 grid of nodes with 12-15 hops between nodes to serve content to client consumption devices. The paths to fetch content files may not be a linear path within the mesh network.

The WMN 100 can provide adequate bandwidth, especially node-to-node bandwidth. For video, content delivery services recommend a minimum of 900 Kbps for standard definition content and 3.5 Mbps for high definition content. The WMN 100 can provide higher bandwidths than those recommended for standard definition and high definition content. Prior solutions found that for a 10,000-node mesh network covering one square kilometer, the upper bound on inter-node traffic is 221 kbps. The following can impact bandwidth: forwarding traffic, wireless contention (MAC/PHY), and routing protocols.

In some embodiments, the WMN 100 can be self-contained as described herein. The WMN 100 may be self-contained in the sense that content resides in, travels through, and is consumed by nodes in the mesh network without requiring the content to be fetched outside of the WMN 100. In other embodiments, the WMN 100 can have mechanisms for content injection and distribution. One or more of the services 120 can manage the setup of content injection and distribution. These services (e.g., labeled mesh network control service) can be hosted by as cloud services, such as on one or more content delivery service devices. These mechanisms can be used for injecting content into the network as new content is created or as user viewing preferences change. Although these injection mechanisms may not inject the content in real time, the content can be injected into the WMN 100 via the point-to-point wireless connection 105 or the HITL process at the mini-POP device 102. Availability and impact on cost in terms of storage may be relevant factors in determining which content is to be injected into the WMN 100 and which content is to remain in the WMN 100. A challenge for traditional mesh network architectures is that this content is high bandwidth (in the case of video) and so the gateway nodes that connect the mesh to the larger Internet must be also be high bandwidth. However, taking a closer look at the use case reveals that this content, although high bandwidth, does not need to be low latency. The embodiments of the WMN 100 described herein can provide distribution of content that is high bandwidth, but in a manner that does not need low latency.

In some embodiments, prior to consumption by a node having an AIV client itself or being wirelessly connected to an AIV client executing on a client consumption device, the content may be pulled close to that node. This may involve either predicting when content will be consumed to proactively move it closer (referred to as caching) or always having it close (referred to as replication). Content replication is conceptually straightforward, but may impact storage requirements and requires apriori knowledge on the popularity of given titles.

Another consideration is where and how to store content in the WMN 100. The WMN 100 can provide some fault tolerance so that a single mesh node becoming unavailable for failure or reboot has minimal impact on availability of content to other users. This means that a single mesh node is not the sole provider of a piece of content. The WMN 100 can use reliability and availability mechanisms and techniques to determine where and how to store content in the WMN 100.

The WMN 100 can be deployed in an unpredictable environment. Radio conditions may not be constant and sudden losses of power may occur. The WMN 100 is designed to be robust to temporary failures of individual nodes. The WMN 100 can be designed to identify those failures and adapt to these failures once identified. Additionally, the WMN 100 can include mechanisms to provide secure storage of the content that resides within the WMN 100 and prevent unauthorized access to that content.

The cloud services 120 of the WMN 100 can include mechanisms to deal with mesh nodes that become unavailable, adding, removing, or modifying existing mesh nodes in the WMN 100. The cloud services 120 may also include mechanisms for remote health and management. For example, there may be a remote health interface, a management interface, or both to access the mesh nodes for this purpose. The cloud services 120 can also include mechanisms for securing the WMN 100 and the content that resides in the WMN 100. For example, the cloud services 120 can control device access, DRM, and node authentication.

Figure 2:
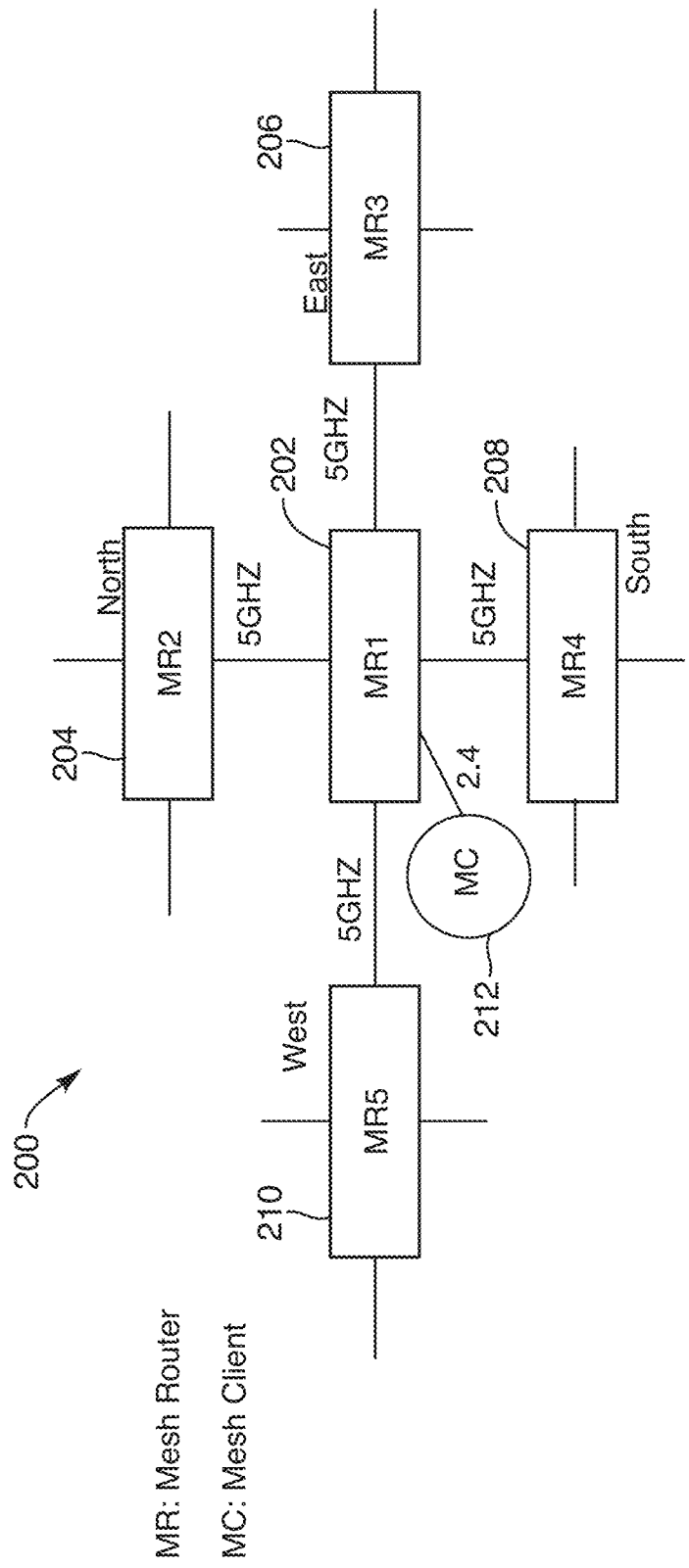
FIG. 2 is a block diagram of a network hardware device with five radios operating concurrently in a WMN according to one embodiment.

FIG. 2 is a block diagram of a network hardware device 202 with five radios operating concurrently in a wireless mesh network 200 according to one embodiment. The wireless mesh network 200 includes multiple network hardware devices 202-210. The network hardware device 202 may be considered a mesh router that includes four 5 GHz radios for the network backbone for multiple connections with other mesh routers, i.e., network hardware devices 204-210. For example, the network hardware device 204 may be located to the north of the network hardware device 202 and connected over a first 5 GHz connection. The network hardware device 206 may be located to the east of the network hardware device 202 and connected over a second 5 GHz connection. The network hardware device 208 may be located to the south of the network hardware device 202 and connected over a third 5 GHz connection. The network hardware device 210 may be located to the west of the network hardware device 202 and connected over a fourth 5 GHz connection. In other embodiments, additional network hardware devices can be connected to other 5 GHz connections of the network hardware device 202. It should also be noted that the network hardware devices 204-210 may also connect to other network hardware devices using its respective radios. It should also be noted that the locations of the network hardware devices 20-210 can be in other locations that north, south, east, and west. For example, the network hardware devices can be located above or below the mesh network device 202, such as on another floor of a building or house.

The network hardware device 202 also includes at least one 2.4 GHz connection to serve client consumption devices, such as the client consumption device 212 connected to the network hardware device 202. The network hardware device 202 may operate as a mesh router that has five radios operating concurrently or simultaneously to transfer mesh network traffic, as well as service connected client consumption devices. This may require that the 5GLL and 5GLH to be operating simultaneously and the 5GHL and 5GHH to be operating simultaneously, as described in more detail below. It should be noted that although the depicted embodiment illustrates and describes five mesh nodes, in other embodiments, more than five mesh nodes may be used in the WMN. It should be noted that FIG. 2 is a simplification of neighboring mesh network devices for a given mesh network device. The deployment of forty or more mesh network device may actually be located at various directions than simply north, south, east, and west as illustrated in FIG. 2. Also, it should be noted that here are a limited number of communication channels available to communicate with neighboring mesh nodes in the particular wireless technology, such as the Wi-Fi® 5 GHz band. The embodiments of the mesh network devices, such as the directional antennas, can help with isolation between neighboring antennas that cannot be separated physically given the limited size the mesh network device.

Figure 3:
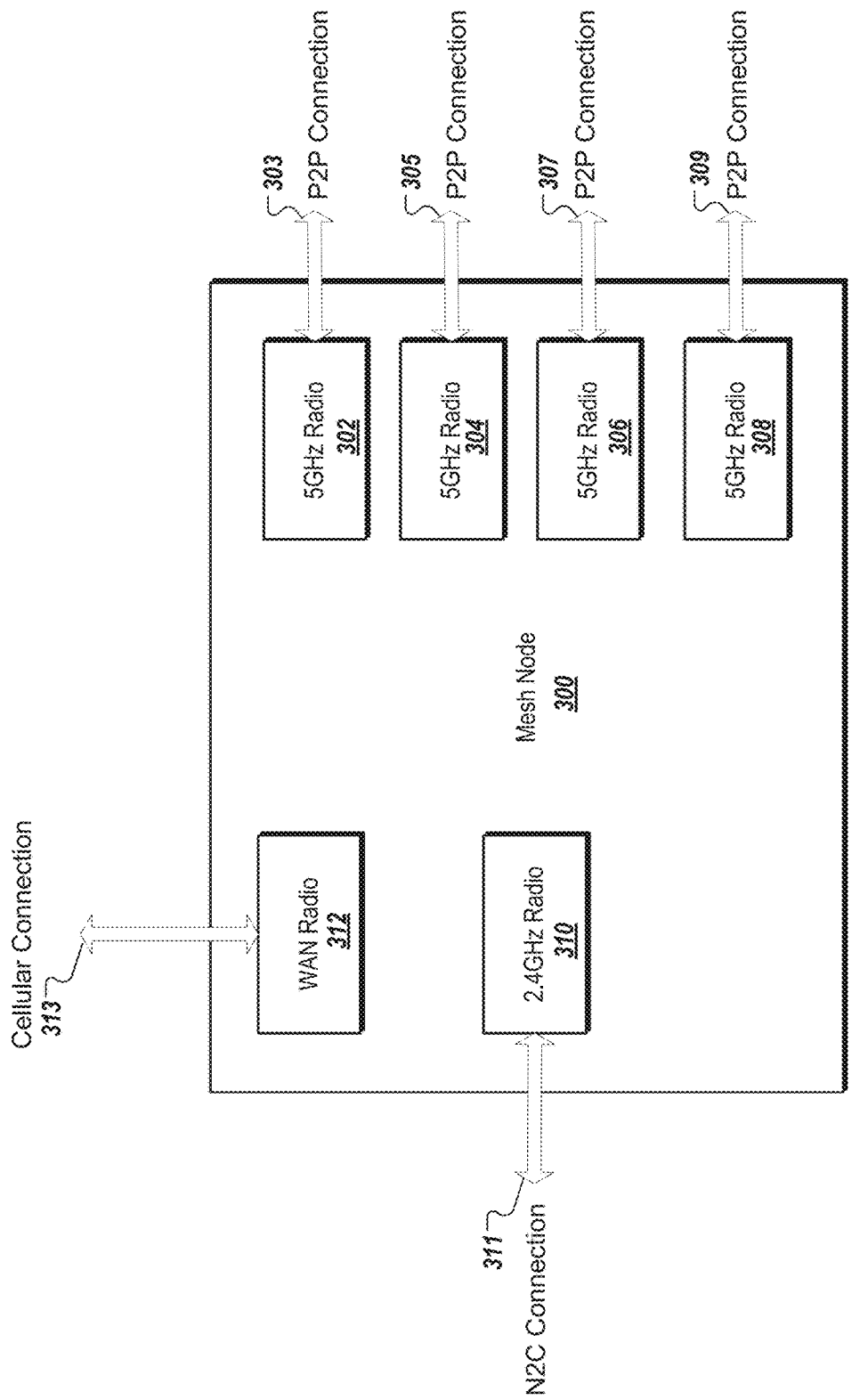
FIG. 3 is a block diagram of a mesh node with multiple radios according to one embodiment.

FIG. 3 is a block diagram of a mesh node 300 with multiple radios according to one embodiment. The mesh node 300 includes a first 5 GHz radio 302, a second 5 GHz radio 304, a third 5 GHz radio 306, a fourth 5 GHz radio 308, a 2.4 GHz radio 310, and a cellular radio 312. The first 5 GHz radio 302 creates a first P2P wireless connection 303 between the mesh node 300 and another mesh node (not illustrated) in a WMN. The second 5 GHz radio 304 creates a second P2P wireless connection 305 between the mesh node 300 and another mesh node (not illustrated) in the WMN. The third 5 GHz radio 306 creates a third P2P wireless connection 307 between the mesh node 300 and another mesh node (not illustrated) in the WMN. The fourth 5 GHz radio 308 creates a fourth P2P wireless connection 309 between the mesh node 300 and another mesh node (not illustrated) in the WMN. The 2.4 GHz radio 310 creates a N2C wireless connection 311 between the mesh node 300 and a client consumption device (not illustrated) in the WMN. The cellular radio 312 creates a cellular connection between the mesh node 300 and a device in a cellular network (not illustrated). In other embodiments, more than one 2.4 GHz radios may be used for more N2C wireless connections. Alternatively, different number of 5 GHz radios may be used for more or less P2P wireless connections with other mesh nodes. In other embodiments, multiple cellular radios may be used to create multiple cellular connections.

In another embodiment, a system of devices can be organized in a WMN. The system may include a single ingress node for ingress of content files into the wireless mesh network. In one embodiment, the single ingress node is a mini-POP node that has attached storage device(s). The single ingress node may optionally include a point-to-point wireless connection, such as a microwave communication channel to a node of the CDN. The single ingress node may include a point-to-point wireless link to the Internet (e.g., a server device of the CDN) to access content files over the Internet. Alternatively to, or in addition to the point-to-point wireless link, the single ingress node may include a wired connection to a storage device to access the content files stored on the storage device. Multiple network hardware devices are wirelessly connected through a network backbone formed by multiple P2P wireless connections. These P2P wireless connections are wireless connections between different pairs of the network hardware devices. The P2P wireless connections may be a first set of WLAN connections that operate at a first frequency of approximately 5.0 GHz. The multiple network hardware devices may be wirelessly connected to one or more client consumption devices by one or more N2C wireless connections. Also, the multiple network hardware devices may be wirelessly connected to a mesh network control services (MNCS) device by cellular connections. Each network hardware device includes a cellular connection to a MNCS service hosted by a cloud computing system. The cellular connections may have lower bandwidths than the point-to-point wireless link.

The system includes a first network hardware device wirelessly connected to a first client consumption device by a first node-to-client (N2C) wireless connection and a second network hardware device wirelessly connected to the single ingress node. The first network hardware device can wirelessly connect to a first client consumption device over a first N2C connection. The N2C wireless connection may be one of a second set of one or more WLAN connections that operate at a second frequency of approximately 2.4 GHz. During operation, the first network hardware device may receive a first request for a first content file from the first client consumption device over the first N2C connection. The first network device sends a second request for the first content file to the second network hardware device through the network backbone via a first set of zero or more intervening network hardware devices between the first network hardware device and the second network hardware device. The first network device receives the first content file from the first network hardware device through the network backbone via the first set of zero or more intervening network hardware devices and sends the first content file to the first client consumption device over the first N2C connection. In a further embodiment, the first network hardware device includes another radio to wirelessly connect to a MNCS device by a cellular connection to exchange control data.

In a further embodiment, the first network hardware device is further to receive a third request for a second content file from a second client consumption device connected to the first network hardware device over a second N2C connection between the first network hardware device and the second client consumption device. The first network hardware device sends a fourth request for the second content file stored at a third network hardware device through the network backbone via a second set of zero or more intervening network hardware devices between the first network hardware device and the third network hardware device. The first network hardware device receives the second content file from the third network hardware device through the network backbone via the second set of zero or more intervening network hardware devices. The first network hardware device sends the second content file to the second client consumption device over the second N2C connection.

In one embodiment, the zero or more intervening network hardware devices of the first set are not the same as the zero or more intervening network hardware devices of the second set. In some embodiments, a path between the first network hardware device and the second network hardware device could include zero or more hops of intervening network hardware devices. In some cases, the path may include up to 12-15 hops within a mesh network of 100×100 network hardware devices deployed in the WMN. In some embodiments, a number of network hardware devices in the WMN is greater than fifty. The WMN may include hundreds, thousands, and even tens of thousands of network hardware devices.

In a further embodiment, the first network hardware device receive the fourth request for the second content file from a fourth network hardware device through the network backbone via a third set of zero or more intervening network hardware devices between the first network hardware device and the fourth network hardware device. The first network hardware device sends the second content file to the fourth network hardware device through the network backbone via the third set of zero or more intervening network hardware devices.

In some embodiments, the first network hardware device determines whether the first content file is stored in memory of the first network hardware device. The memory of the first network hardware device may be volatile memory, non-volatile memory, or a combination of both. When the first content file is not stored in the memory or the storage of the first network hardware device, the first network hardware device generates and sends the second request to a first network hardware device of the first set. Intervening network hardware devices can make similar determinations to locate the first content file in the WMN. In the event that the first content file is not stored in the second network hardware device or any intervening nodes, the second network hardware device can request the first content file from the mini-POP node, as described herein. When the mini-POP node does not store the first content file, the mini-POP can take action to obtain the first content file, such as requesting the first content file from a CDN over a point-to-point link. Alternatively, the human in the loop process can be initiated as described herein.

In a further embodiment, the second network hardware device receives the second request for the first content file and retrieves the first content file from the single ingress node when the first content file is not previously stored at the second network hardware device. The second network hardware device sends a response to the second request with the first content file retrieved from the single ingress node. The second network hardware device may store a copy of the first content file in memory of the second network hardware device for a time period.

In another embodiment, the single ingress node receives a request for a content file from one of the multiple network hardware devices over a P2P wireless connection. The request originates from a requesting consumption device. It should be noted that a video client can be installed on the client consumption device, on the network hardware device, or both. The single ingress node determines whether the content file is stored in a storage device coupled to the single ingress node. The single ingress node generates and sends a first notification to the requesting one of the network hardware devices over the P2P wireless connection when the content file is not stored in the storage device. The first notification includes information to indicate an estimated delay for the content file to be available for delivery. The single ingress node generates and sends a second notification to an operator of the first network hardware device. The second notification includes information to indicate that the content file has been requested by the requesting client consumption device. In this embodiment, the notifications can be pushed to the appropriate recipients. In another embodiment, an operator can request which content files had been requested in the WMN and not serviced. This can initiate the ingress of the content file into the WMN, even if with a longer delay.

In some embodiments, the mini-POP node is coupled to a storage device to store the content files as original content files for the wireless mesh network. A point-to-point wireless link may be established between the mini-POP node and a node of a CDN. In another embodiment, the mini-POP node is coupled to a node of a content delivery network (CDN) via a microwave communication channel.

In a further embodiment, the second network hardware device can wirelessly connect to a third network hardware device over a second P2P connection. During operation, the third network hardware device may receive a third request for a second content file from a second client consumption device over a second N2C connection between the third network hardware device and the second client consumption device. The third network hardware device sends a fourth request for the second content file to the second network hardware device over the second P2P connection. The third network hardware device receives the second content file from the second network hardware device over the second P2P connection and sends the second content file to the second client consumption device over the second N2C connection.

In another embodiment, the first network hardware device receives the fourth request for the second content file from the third network hardware device. The second network hardware device determines whether the second content file is stored in memory of the second network hardware device. The second network hardware device sends a fifth request to the first network hardware device over the first P2P connection and receive the second content file over the first P2P connection from the first network hardware device when the second content file is not stored in the memory of the second network hardware device. The second network hardware device sends the second content file to the third network hardware device over the second P2P connection.

In another embodiment, the second network hardware device may wirelessly connect to a third network hardware device over a second P2P connection. During operation, the third network hardware device may receive a third request for the first content file from a second client consumption device over a second N2C connection between the third network hardware device and the second client consumption device. The third network hardware device sends a fourth request for the first content file to the second network hardware device over the second P2P connection. The third network hardware device receives the first content file from the first network hardware device over the second P2P connection and sends the first content file to the second client consumption device over the second N2C connection.

In another embodiment, the first network hardware device receives a request for a content file from one of the network hardware devices over one of the P2P wireless connections. The request is from a requesting client consumption device connected to one of the multiple network hardware devices. The first network hardware device determines whether the content file is stored in the storage device. The first network hardware device generates and sends a first notification to the one of the network hardware devices over the one of the P2P wireless connections when the content file is not stored in the storage device. The first notification may include information to indicate an estimated delay for the content file to be available for delivery. The first network hardware device generates and sends a second notification to an operator of the first network hardware device. The second notification may include information to indicate that the content file has been requested by the requesting client consumption device.

In a further embodiment, the P2P wireless connections are WLAN connections that operate in a first frequency range and the N2C connections are WLAN connections that operate in a second frequency range. In another embodiment, the P2P wireless connections operate at a first frequency of approximately 5.0 GHz and the N2C connections operate at a second frequency of approximately 2.4 GHz.

In some embodiments, at least one of the network hardware devices is a mini-POP) node and a point-to-point wireless link is established between the mini-POP node and a POP node of an ISP. In one embodiment, the point-to-point wireless link is a microwave link (e.g., directional microwave link) between the mini-POP node and the node of the CDN. In another embodiment, the mini-POP node stores an index of the content files store in attached storage devices.

In some embodiments, a mesh network architecture includes multiple mesh nodes organized in a self-contained mesh network. The self-contained mesh network may be self-contained in the sense that content resides in, travels through, and is consumed by nodes in the mesh network without requiring the content to be fetched outside of the mesh network. Each of the mesh nodes includes a first radio for inter-node communications with the other nodes on multiple P2P channels, a second radio for communications with client consumption devices on N2C channels. The mesh network architecture also includes a mini-POP node including a radio for inter-connection communications with at least one of the mesh nodes on a P2P channel. The mesh network architecture also includes a storage device coupled to the mini-POP, the storage device to store content files for distribution to a requesting client consumption device. The mini-POP node may be a single ingress point for content files for the self-contained mesh network. The storage devices of the mini-POP node may be internal drives, external drives, or both. During operation, a first node of the mesh nodes includes a first radio to wirelessly connect to a requesting client consumption device via a first N2C channel to receive a first request for a content file directly from the requesting client consumption device via a first N2C channel between the first node and the requesting client consumption device 1. A second radio of the first node sends a second request for the content file to a second node via a first set of zero or more intervening nodes between the first node and the second node to locate the content file within the self-contained mesh network. The second radio receives the content file from the second node in response to the request. The first radio sends the content file to the requesting client consumption device via the first N2C channel. The first node determines a location of the content file within the self-contained mesh network and sends a second request for the content file via a second P2P channel to at least one of the mini-POP or a second node, the second request to initiate delivery of the content file to the requesting client consumption device over a second path between the location of the content file and the requesting client consumption device.

In another embodiment, the first node stores a copy of the content file in a storage device at the first node. The first node receives a third request for the content file directly from a second client consumption device via a second N2C channel between the first node and the second client consumption device. The first node sends the copy of the content file to the second client consumption device via the second N2C channel in response to the third request.

In a further embodiment, the first node receives the content file via the second P2P channel in response to the second request and sends the content file to the requesting client consumption device via the first N2C channel or the first P2P channel in response to the first request. In some embodiments, the second path and the first path are the same.

In a further embodiment, the first node includes a third radio to communicate control data over a cellular connection between the first node and a mesh network control service (MNCS) device.

In one embodiment, the second radio can operate with 2×2 MIMO with maximum 40 MHz aggregation. This may result in per radio throughput of not more than 300 Mbps in 5 GHz and 150 Mbps in 2.4 GHz. Even with 5 radios (4×5 GHz and 1×2.4), the peak physical layer throughput will not need to be more than 1.4 Gbps. A scaling factor of 1.4 may be used to arrive at a CPU frequency requirement. This implies the total processing clock speed in the CPU should not be less than 1.96 GHz (1.4×1.4=1.96 GHz). For example, the Indian ISM band has a requirement of 23 dBm EIRP. Since the WMN 100 needs to function under conditions where the mesh routers communicate with each other between homes, the propagation loss through multiple walls and over distances between homes, the link budget does not support sensitivity requirements for 802.11ac data rates. The per-node throughput may be limited to 300 Mbps per link—peak PHY rate.

In another embodiment, a system includes a POP node having access to content files via at least one of data storage coupled to the POP node or a first point-to-point connection to a first device of an ISP. The system also includes multiple mesh nodes, organized in a WMN, and at least one of the mesh nodes is wirelessly coupled to the POP node. The WMN is a mesh topology in which the multiple mesh nodes cooperate in distribution of the content files to client consumption devices that do not have access to reliable access to the server device of the CDN or in an environment of limited connectivity to broadband infrastructure. A first node of the multiple mesh nodes is a multi-radio, multi-channel (MRMC) device that includes multiple P2P connections to form parts of a network backbone in which the first node wireless connects to other mesh nodes via a first set of WLAN channels reserved for inter-node communication. The first node also includes one or more N2C connections to wireless connect to one or more of the client consumption devices connected to the WMN via a second set of WLAN channels reserved for serving the content files to the client consumption devices. The first node may also include a cellular connection to wireless connect to a second device of the CDN. The second device may be part of a cloud computing system and may host a mesh network control service as described herein. It should be noted that the first point-to-point connection is higher bandwidth than the cellular connection.

Figure 4:
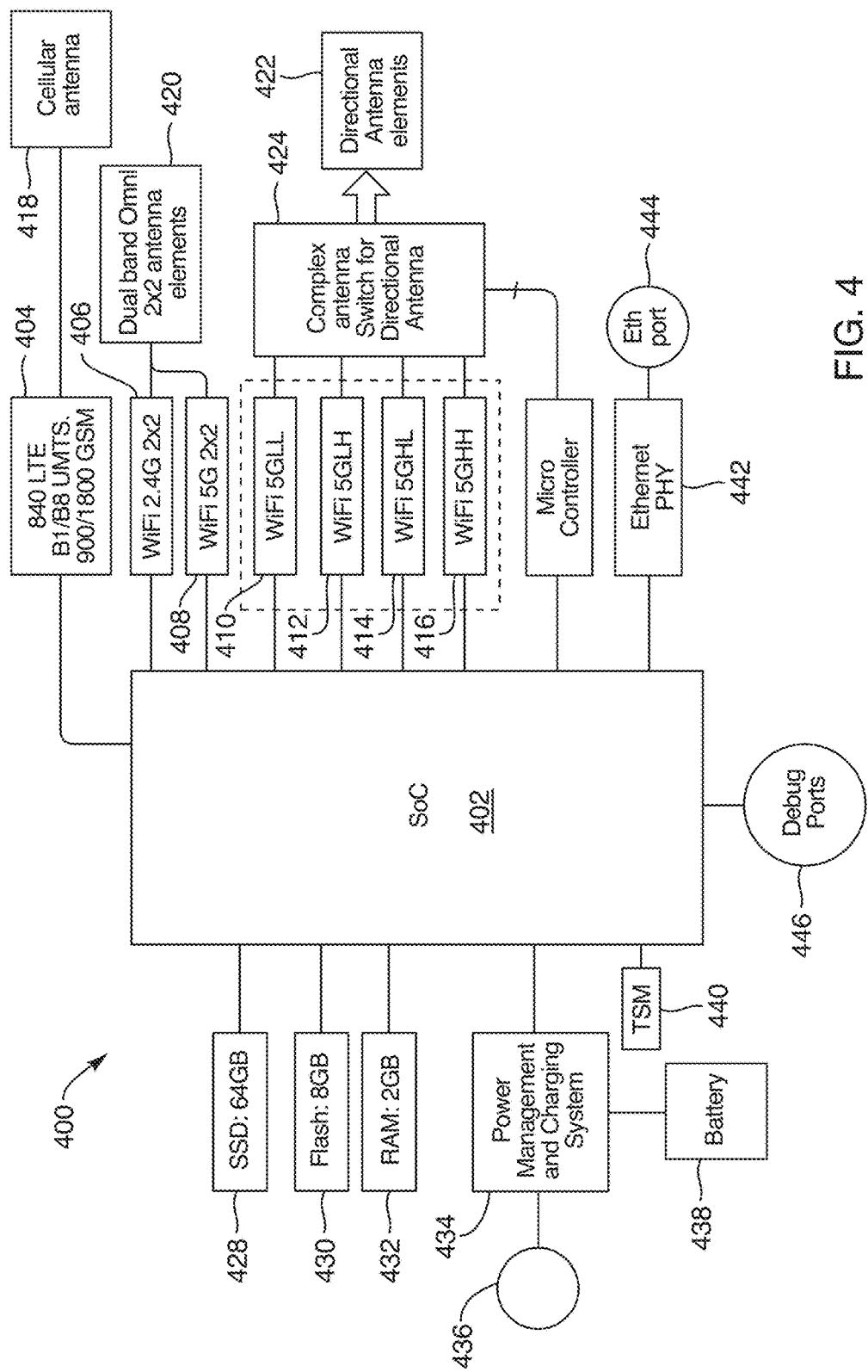
FIG. 4 is a block diagram of a mesh network device according to one embodiment.

FIG. 4 is a block diagram of a mesh network device 400 according to one embodiment. The mesh network device 400 may be one of many mesh network devices organized in a WMN (e.g., WMN 100). The mesh network device 400 is one of the nodes in a mesh topology in which the mesh network device 400 cooperates with other mesh network devices in distribution of content files to client consumption devices in an environment of limited connectivity to broadband Internet infrastructure, as described herein. The mesh network device 400 may be the mini-POP node 102 of FIG. 1. Alternatively, the mesh network device 400 may be any one of the mesh network devices 104-110 of FIG. 1. In another embodiment, the mesh network device 400 is any one of the network hardware devices 202-210 of FIG. 2. In another embodiment, the mesh network device 400 is the mesh node 300 of FIG. 3.

The mesh network device 400 includes a system on chip (SoC) 402 to process data signals in connection with communicating with other mesh network devices and client consumption devices in the WMN. The SoC 402 includes a processing element (e.g., a processor core, a central processing unit, or multiple cores) that processes the data signals and controls the radios to communicate with other devices in the WMN. In one embodiment, the SoC 402 is a dual core SoC, such as the ARM A15 1.5 GHz with hardware network acceleration. The SoC 402 may include memory and storage, such as 2 GB DDR RAM and 64 GB eMMC coupled to the SoC 402 via external HDD interfaces (e.g., SATA, USB3, or the like). The SoC 402 may include multiple RF interfaces, such as a first interface to the first RF module 404 (e.g., HSCI interface for cellular module (3G)), a second interface to the WLAN 2.4 GHz radio 406, a third interface to the WLAN 2.4 GHz radio 408, and multiple interfaces to the WLAN 5 GHz radios, such as on a PCIe bus. In one embodiment, the SoC 402 is the IPQ8064 Qualcomm SoC or the IPQ4029 Qualcomm SoC. Alternatively, other types of SoCs may be used, such as the Annapurna SoC, or the like. Alternatively, the mesh network device 400 may include an application processor that is not necessarily considered to be a SoC.

The mesh network device 400 may also include memory and storage. For example, the mesh network device 400 may include SSD 64 GB 428, 8 GB Flash 430, and 2 GB 432. The memory and storage may be coupled to the SoC 402 via one or more interfaces, such as USB 3.0, SATA, or SD interfaces. The mesh network device 400 may also include a single Ethernet port 444 that is an ingress port for Internet Protocol (IP) connection. The Ethernet port 444 is connected to the Ethernet PHY 442, which is connected to the SoC 402. The Ethernet port 444 can be used to service the mesh network device 400. Although the Ethernet port 444 could provide wired connections to client devices, the primary purpose of the Ethernet port 444 is not to connect to client devices, since the 2.4 GHz connections are used to connect to clients in the WMN. The mesh network device 400 may also include one or more debug ports 446, which are coupled to the SoC 402. The memory and storage may be used to cache content, as well as store software, firmware or other data for the mesh network device 400.

The mesh network device 400 may also include a power management and charging system 434. The power management and charging system 434 can be connected to a power supply 436 (e.g., 240V outlet, 120V outlet, or the like). The power management and charging system 434 can also connect to a battery 438. The battery 438 can provide power in the event of power loss. The power management and charging system 434 can be configured to send a SoS message on power outage and backup system state. For example, the WLAN radios can be powered down, but the cellular radio can be powered by the battery 438 to send the SoS message. The battery 438 can provide limited operations by the mesh network device 400, such as for 10 minutes before the entire system is completely powered down. In some cases, power outage will likely affect a geographic area in which the mesh network device 400 is deployed (e.g., power outage that is a neighborhood wide phenomenon). The best option may be to power down the mesh network device 400 and let the cloud service (e.g., back end service) know of the outage in the WMN. The power management and charging system 434 may provide a 15V power supply up to 21 watts to the SoC 402. Alternatively, the mesh network device 400 may include more or less components to operate the multiple antennas as described herein.

The mesh network device 400 includes a first radio frequency (RF) module 404 coupled between the SoC 402 and a cellular antenna 418. The first RF module 404 supports cellular connectivity using the cellular antenna 418. In one embodiment, the cellular antenna 418 includes a primary wide area network (WAN) antenna element and a secondary WAN antenna element. The first RF module 404 may include a modem to cause the primary WAN antenna, the secondary WAN antenna, or both to radiate electromagnetic energy in the 900 MHz band and 1800 MHz band for the 2G specification, radiate electromagnetic energy in the B1 band and the B8 band for the 3G specification, and radiate electromagnetic energy for the B40 band. The modem may support Cat3 band, 40 TD-LTE, UMTS: Band 1, Band 8, and GSM: 900/1800. The modem may or may not support CDMA. The cellular modem may be used for diagnostics, network management, down time media caching, meta data download, or the like. Alternatively, the first RF module 404 may support other bands, as well as other cellular technologies. The mesh network device 400 may include a GPS antenna and corresponding GPS module to track the location of the mesh network device 400, such as moves between homes. However, the mesh network device 400 is intended to be located inside a structure, the GPS antenna and module may not be used in some embodiments.

The mesh network device 400 includes a first set of wireless local area network (WLAN) modules 406, 408 coupled between the SoC 402 and dual-band omni-directional antennas 420. A first WLAN module 406 may support WLAN connectivity in a first frequency range using one of the dual-band omni-directional antennas 420. A second WLAN module 408 may support WLAN connectivity in a second frequency range using one of the dual-band omni-directional antennas 420. The dual-band omni-directional antennas 420 may be two omnidirectional antennas for 2.4 GHz. The directional antennas 422 may be eight sector directional antennas for 5 GHz with two antennas at orthogonal polarizations (horizontal/vertical) in each sector. These can be setup with 45 degree 3 dB beam width with 11 dB antenna gain. The dual-band omni-directional antennas 420 and the directional antennas 422 can be implemented as a fully switchable antenna architecture controlled by micro controller 426. For example, each 5 GHz radio can choose any 2 sectors (for 2 2×2 MU-MIMO streams).

The mesh network device 400 includes a second set of WLAN modules 410-416 coupled between the SoC 402 and antenna switching circuitry 424. The second set of WLAN modules 410-416 support WLAN connectivity in the second frequency range using a set of directional antennas 422. The second set of WLAN modules 410-416 is operable to communicate with the other mesh network devices of the WMN. The antenna switching circuitry 424 is coupled to a micro controller 426. The micro controller 426 controls the antenna switching circuitry 424 to select different combinations of antennas for wireless communications between the mesh network device 400 and the other mesh network devices, the client consumption devices, or both. For example, the micro controller 426 can select different combinations of the set of directional antennas 422. The antenna switching circuitry 424 is described in more detail below with respect to FIGS. 5-7.

In another embodiment, a filter switch bank is coupled between the antenna switching circuitry 424 and the second set of WLAN modules 410-416. In another embodiment, the filter switch bank can be implemented within the antenna switching circuitry 424.

In the depicted embodiment, the first set of WLAN modules include a first a first 2×2 2.4 GHz MIMO radio 406 and a 2×2 5 GHz MIMO radio 408. The second set of WLAN modules includes a first 2×2 5 GHz MIMO radio 410 ("5GLL"), a second 2×2 5 GHz MIMO radio 412 ("5GLH"), a third 2×2 5 GHz MIMO radio 414 ("5GHL"), and a fourth 2×2 5 GHz MIMO radio 416 ("5GHH"). The dual-band omni-directional antennas 420 may include a first omni-directional antenna and a second omni-directional antenna (not individually illustrated in FIG. 4). The set of directional antennas 422 comprises: a first horizontal orientation antenna; a first vertical orientation antenna; a second horizontal orientation antenna; a second vertical orientation antenna; a third horizontal orientation antenna; a third vertical orientation antenna; a fourth horizontal orientation antenna; a fourth vertical orientation antenna; a fifth horizontal orientation antenna; a fifth vertical orientation antenna; a sixth horizontal orientation antenna; a sixth vertical orientation antenna; a seventh horizontal orientation antenna; a seventh vertical orientation antenna; an eighth horizontal orientation antenna; an eighth vertical orientation antenna; a ninth antenna (upper antenna described herein); a tenth antenna (upper antenna); an eleventh antenna (bottom antenna); and a twelfth antenna (bottom antenna).

In one embodiment, the mesh network device 400 can handle antenna switching in a static manner. The SoC 402 can perform sounding operations with the WLAN radios to determine a switch configuration. Switching is not done on a per packet basis or at a packet level. The static switch configuration can be evaluated a few times a day by the SoC 402. The SoC 402 can include the intelligence for switching decision based on neighbor sounding operations done by the SoC 402. The micro controller 426 can be used to program the antenna switching circuitry 424 (e.g., switch matrix) since the mesh network device 400 may be based on CSMA-CA, not TDMA. Deciding where the data will be coming into the mesh network device 400 is not known prior to receipt, so dynamic switching may not add much benefit. It should also be noted that network backbone issues, such as one of the mesh network devices becoming unavailable, may trigger another neighbor sounding process to determine a new switch configuration. Once the neighbor sounding process is completed, the mesh network device 400 can adapt a beam patter to be essentially fixed since the mesh network devices are not intended to move once situated.

In one embodiment, the antenna switching circuitry 424 includes multiple diplexers and switches to connect different combinations of antennas to the multiple radios. FIGS. 5-7 illustrate three different architectures for the antenna switching circuitry 424. The following diagrams use the following notations for reference:

ANT Hx→Horizontal orientation device side antenna
ANT Vx→Vertical orientation device side antenna
ANT VB→Vertical orientation device bottom side antenna
ANT HB→Horizontal orientation device bottom side antenna
ANT VU→Vertical orientation device top side antenna
ANT HU→Horizontal orientation device top side antenna
ANT0→Omni directional antenna
ANT1→Omni directional antenna One configuration for the antenna switching circuitry 424 is a switch matrix architecture. In this architecture, there are six 2×2 WLAN radios (also referred to as the Wi-Fi® radios). Five radios are 5 GHz band and one radio is a 2.4 GHz radio. A switch matrix is implemented to allow the connection of each and any of the four 2×2 radios to any of the Vx/Hx MIMO antennas. Based on the switch matrix configuration and based on the routing algorithms input, each 2×2 radio can connect to a specific antenna pair in a specific direction. Each 2×2 radio can operate using a dedicated and unique WLAN frequency channel concurrently or simultaneously. In this architecture, two of the radios (5 GHz radio and 2.4 GHz radio) may have fixed connections to the omni-directional antennas (Ant0 and Ant1). These two radios may also have access to all the WLAN 2.4 GHz and 5 GHz band channels. In another embodiment, this architecture also may also have 4G/3G and 2G WAN radio to provide cellular connectivity to the mesh network device 400.

As described herein, antenna isolation between two radios impacts whether a device can operate the radios simultaneously. The network hardware devices may include three types of radios, two of which operate with a frequency separation that is less than 100 MHz. The third radio may have a frequency separation greater than 100 MHz from the other frequency ranges. For example, a first network hardware device communicates with a second network hardware device when not serving data to a client device. When serving data to a client device, the first network hardware device communicates WWAN data to a WWAN network through a third network hardware device in the WMN that has its own WWAN connection to create spatial separation for simultaneous communication.

As described herein, in a mesh network configuration where we have multiple mesh network devices connected to each other, and each mesh network device has multiple radios, such as Wi-Fi®, Bluetooth®, and cellular capabilities. Though a given mesh network device may not be able to satisfy the needed isolation between different radios individually, one or more other mesh network devices in the mesh environment can help provide a simultaneous operation inside the device itself. The one or more other mesh network devices can provide sufficient frequency separation between the two types of communications. For example, the mesh network configuration can provide a special separation for simultaneous operation between two independent mesh network devices that will give the same result as achieving the operation on one mesh network device.

FIG. 5-7 are generally directed to mesh network configurations to create spatial separation between simultaneous operated radios according to various embodiments.

FIG. 5 is a network diagram of three mesh network devices 510, 520, 530 in a WMN 500 according to one implementation. The first mesh network device 510 includes a first radio 512, a second radio 514, and a third radio 516 (each illustrated with the corresponding antennas). The first radio 512 may be a cellular radio (or WWAN radio) that can communicate with a cellular network. The second radio 514 may be a first WLAN radio (e.g., 2.4 GHz Wi-Fi® radio) that can communicate with a client consumption device 540 over a first WLAN connection 518. Multiple client consumption devices can be connected to the first mesh network device 510. The third radio 516 may be a second WLAN radio (e.g., 5 GHz Wi-Fi® radio) that can communicate with one or more mesh network devices of the WMN 500, including the second mesh network device 520 and the third mesh network device 530. The third radio 516 communicates with a similar radio of the second mesh network device 520 over a first WLAN connection 522. The third radio 516 also communicates with a similar radio of the third mesh network device 530 over a second WLAN connection 532. Multiple client consumption devices can be connected to the third mesh network device 530 over WLAN connections. The first mesh network device 510 is physically separated from the second mesh network device 520 and the third mesh network device 530. The distance between the mesh network devices can be based less than a maximum distance for the particular wireless technology being used.

As illustrated in FIG. 5, the mesh network devices are connected together through a network backbone of P2P connections. Each mesh network device can serve some client devices in close proximity of the respective mesh network device. The content can be served to a client device by the mesh network device and that particular mesh network device can retrieve the content from one of the other mesh network devices when the content is not already stored on the mesh network device that is serving the clients. For example, the client consumption device 540 may request data from the first mesh network device 510 to which it is connected via the WLAN connection 518. The first mesh network device 510 retrieves the requested data from the second mesh network device 520. The second mesh network device 520 sends the data 524 to the first mesh network device 510 over the WLAN connection 522. The first mesh network device 510 then sends the data 524 to the client consumption device 540 over the WLAN connection 518. In particular, the first mesh network device 510 receives the data 524 using the third radio 516 that operates at 5 GHz and sends the data 524 to the client consumption device 540 using the second radio 514 that operates at 2.4 GHz. The mesh network device 510 can operate the second radio 514 and the third radio 516 simultaneously since these radios operate on frequencies that have a frequency separation greater than 100 MHz for this particular mesh network device design. These two frequencies in particular are far from each other in the frequency spectrum. The mesh network device 520 can meet the isolation requirement for simultaneous operation, regardless of the size of the mesh network device. For example, the first radio may be a Cellular WAN LTE radio operating on band 40, such as 2.3 GHz to 2.4 GHz. The second radio 514 can be a Wi-Fi 2.4 GHz 2×2 radio. The third radio 516 can be a Wi-Fi 5 Ghz 2×2 radio. Each mesh network device can provide a simultaneous operation between the Wi-Fi 2.4 GHz radio (connection to client) and the Wi-Fi 5 Ghz radio (connection to other mesh network device), since these radios operate on frequencies that are far from each other in the spectrum. This makes the isolation requirements for the simultaneous operation reasonably achievable. In this wireless mesh network 500, the links quality information can achieve 180 Mbps TCP for the 5 GHz link between the mesh network devices and 75 Mbps for the 2.4 GHz link (e.g., 518) between the mesh network device 510 and the client consumption device 540.

In one embodiment, the second radio 514 and the third radio 516 are the same radio. In another embodiment, the second radio 514 is coupled to a second antenna and the third radio 516 is coupled to a third antenna. In another embodiment, the second radio 514 and the third radio 516 are coupled to the same antenna.

FIG. 6 is a network diagram of the three mesh network devices 510, 520, 530 using time sharing access between a first radio 512 (LTE radio) and a second radio 514 (WLAN radio) according to one implementation. Once a need arises on one of the mesh network devices to communicate data using the first antenna 512, such as data to or from an LTE network, the mesh network device 512 connects to a network device in the network, such as an LTE network over LTE band 40. Since the LTE band 40 is close in frequency to the Wi-Fi 2.4 GHz used by the second radio 514, the first mesh network device 510 does not permit simultaneous operation since the isolation between the first antenna 512 (LTE antenna) and the second antenna 514 (2.4 GHz antenna) is low on the 2.4 GHz frequency. So, to achieve the connection between the LTE network and the client consumption device 540, the first mesh network device 510 shares the time domain between the first radio 512 (LTE radio) and the second radio 514 (Wi-Fi radio) to avoid desensitization. In particular, the first mesh network device 510 communicates data 524 with the client consumption device 540 over the WLAN connection 518. The first mesh network device 510 also communicates data 624 with a cell tower 630 over a cellular connection 626. However, the data 524 and the data 624 are not communicated simultaneously. Rather, the data 524 and the data 624 are communicated using time sharing according to a coexistence algorithm. This time switching may cause both links to drop the throughput performance to less than 50%. The performance on the WLAN connection (also referred to WLAN link) may drop from 75 Mbps to less than 35 Mbps depending on the LTE network packet demand.

The embodiments described herein are direct to technologies to permit sufficient isolation between radios in electronic devices, regardless of the size by leveraging other mesh network devices in the WMN to create spatial frequency between the two types of communications within the two frequency ranges that are within 100 MHz separation. For example, FIG. 7 illustrates how mesh network devices can be used to create spatial separation between the LTE radio and the WLAN, such as by routing the data from a first mesh network device to a second mesh network device to communicate with its corresponding LTE radio.

FIG. 7 is a network diagram of the three mesh network devices with embodiments to create spatial separation between the first radio 512 (LTE radio) and the second radio 514 (WLAN radio) by routing the data from a first mesh network device 510 to a second mesh network device 520. In this embodiment, a first mesh network device 710 in a WMN 700 includes a WWAN antenna coupled to a first radio 712 (referred to as WWAN antenna 712), a first WLAN antenna coupled to a second radio 714 (referred to first WLAN antenna 714), and a second WLAN antenna coupled to a third radio 716 (referred to second WLAN antenna 716). The WWAN radio 712 operates in a first frequency range. The first WLAN radio 714 operates in a second frequency range. A first frequency separation between the first frequency range and the second frequency range is less than 100 MHz. The second WLAN radio 716 operates in a third frequency range. A second frequency separation between the first frequency range and the third frequency range is greater than the 100 MHz. In some cases, the second frequency separation may be greater than 2 GHz.

The first mesh network device 710 includes a processing device (not illustrated in FIG. 7) that is operable to determine when each of the radios is operating. In one embodiment, the processing device determines that the WWAN radio 712 is communicating with a WWAN network device 750 (e.g., cell tower) over a first WWAN connection (not illustrated in FIG. 7) in the first frequency range simultaneously while the first WLAN radio 714 is communicating with a client consumption device 740 over a node-to-client (N2C) wireless connection 718 in the second frequency range. Instead of time slicing the data, as described above with respect to FIG. 6, the processing device uses an alternate communication path between the WWAN network device 750 and the mesh network device 710 via a second mesh network device 720 to create spatial separation for simultaneous WLAN communications and WWAN communications. The alternate communication path includes (i) a first peer-to-peer (P2P) wireless connection 722 between the mesh network device 710 and the second mesh network device 720 and (ii) a second WWAN connection 726 between the WWAN network device 750 and the second mesh network device 720. The wireless connections between the devices may already be established and the processing device uses these wireless connections to form the alternate path. In some cases, the processing device establishes wireless connections when they are not already established. The processing device ceases communication with the WWAN network device 750 using the first WWAN connection and communicates with the WWAN network device 750 using the second WLAN radio through the alternative communication path while the first WLAN radio 714 is simultaneously communicating with the client consumption device. The WWAN data 724, 732 is sent or received simultaneous with the WLAN data 724. It should be noted that the data 728 communicated between the first mesh network device 710 and the second mesh network device 720 can include both WWAN data and WLAN data that is sent by the first mesh network device 710 to the client consumption device 740. It should be noted that the second mesh network device 720 is not serving data to a client consumption device.

In one embodiment, the second WLAN radio 716 includes a first WLAN channel for the first P2P wireless connection 722 with the second mesh network device 720 and a second WLAN channel for a second P2P wireless connection 732 between the first mesh network device 710 and a third mesh network device 730. The third mesh network device 730 may be servicing one or more client consumption devices. In a further embodiment, the processing device can determine that the second mesh network device 720 is communicating with a second client consumption device over a second N2C wireless connection (not illustrated in FIG. 7). The processing device can use a second alternate communication path between the WWAN network device 750 and the first mesh network device 710. The second alternate communication path comprises a second P2P wireless connection between the mesh network device 710 and a fourth mesh network device (not illustrated in FIG. 7) and a third WWAN connection between the WWAN network device 750 and the third mesh network device. The processing device cease communication with the WWAN network device 720 using the second WLAN radio 716 through the alternate communication path and communicates with the WWAN network device 720 while the first WLAN radio 714 is simultaneously communicating with the client consumption device 540.

In one embodiment, the first frequency range is the LTE band 40 at 2.4 GHz, the second frequency range is the WLAN 2.4 GHz band, and the third frequency range is the WLAN 5 GHz band. In another embodiment, the first frequency range is the LTE band 7 at 2.5 GHz, the second frequency range is the WLAN 2.4 GHz band, and the third frequency range is the WLAN 5 GHz band. In another embodiment, the first antenna is a cellular antenna and the first radio is a cellular radio. In another embodiment, the first antenna is a personal area network (PAN) antenna and the first radio is a PAN radio, such as a radio that communicates according to the Bluetooth® standard(s).

The WMN 700 brings an opportunity to have a solution for the issues described above that affects radio performance. Since the mesh network devices 710, 720, 730 are connected together via 5 GHz radios, the mesh network can be reconfigured in such a way that creates spatial separation between the radios that needs to coexist on close frequencies.

In another embodiment, when a request for data through an LTE connection is generated while the mesh network device 710 is serving a client consumption device on 2.4 GHz band, the mesh network device 710 can use an alternate path to communicate the data through an LTE connection with a neighboring mesh network device. When the mesh network device 710 determines this condition, a coexistence reconfiguration request is sent to a mesh network control service (MNCS). This coexistence reconfiguration request may be sent over the LTE connection between the mesh network device 710 and the WWAN network device 750 (e.g., cell tower). A response can be received over the LTE connection. In some cases, a new alternate path for the LTE connection is established between the WWAN network device 750 and the mesh network device 710 using the LTE radio and LTE antenna of the second mesh network device 720. It can be said that the LTE connection is routed through the mesh network to a second mesh network device that is not currently serving a 2.4 GHz client consumption device. For example, the second mesh network device 720 is not serving data to a client consumption device at the same time as the LTE connection between the second mesh network device and the WWAN network device 750. Data flows from the LTE network to the second mesh network device 720 and the second mesh network device 720 passes the data to the first mesh network device 710. The first mesh network device 710 serves the data through its 2.4 GHz radio to the client consumption device while the data flows from the LTE network via the second mesh network device 720.

In another embodiment, instead of sending a coexistence reconfiguration request to the MNCS, the mesh network device 710 can communicate with the second mesh network device 720 to handoff the LTE connection. In this embodiment, the mesh network device 710, upon determining that the two radios would be communicating at the same time, can instruct the second mesh network device 720 to establish a new wireless connection, or use an already established wireless connection, with the WWAN network device 750 to communicate data for the mesh network device 710. In this manner, the mesh network device 710 can use P2P connections to establish a new LTE connection from another mesh network device that is not serving the client consumption devices on the frequency that is less than 100 MHz from the frequency of the LTE connection. In other embodiments, the mesh network devices can use cooperative networking techniques or pseudo-cooperative networking techniques to route the LTE connection from the mesh network device 710 to another mesh network device in the mesh network who is not serving client consumption devices. In one embodiment, the mesh network device 710 can determine whether a first set of mesh network devices that are directly adjacent to the mesh network device 710 are available for LTE communications (i.e., mesh network device that is not serving a client consumption device). A directly adjacent mesh network device is a mesh network device that is wirelessly connected to the mesh network device 710. This can be considered a first ring of mesh network devices centered on the mesh network device 710. In the event that there is no available mesh network devices in the first set of adjacent mesh network devices, the mesh network device 710 can determine whether any mesh network devices that are directly adjacent to the first set are available for LTE communications and the LTE connection can be transferred to one of those mesh network devices.

As shown in FIG. 7, this configuration creates a spatial separation between the radios that need to simultaneously operate using close frequencies. Since the first mesh network device 710 itself did not allow for enough separation between its LTE antenna and Wi-Fi 2.4 GHz antenna, using the LTE connection in a neighboring mesh network device provides the spatial separation to avoid the desensitization that would have been generated in first mesh network device 710.

In another embodiment, a network hardware device includes a processing device, a first radio, a second radio, and a third radio. The first radio communicates first data over a first wireless connection between the network hardware device and a second network device in a first frequency range. The second radio communicates second data over a second wireless connection between the network hardware device and a client device in a second frequency range. A first frequency separation between the first frequency range and the second frequency range is less than 100 MHz. The third radio communicates third data over a third wireless connection between the network device and a third network device in a third frequency range. A second frequency separation between the first frequency range and the third frequency range is equal to or greater than the 100 MHz. The processing device determines that the first radio and the second radio are communicating the first data and the second data simultaneously over the first wireless connection and the second wireless connection, respectively. The processing device communicates the second data to the client device over the second wireless connection. While the second data is communicated to the client device over the second wireless connection, the processing device (i) ceases communication over the first wireless connection and (ii) communicates the first data to the third network hardware device over the third wireless connection. The third network hardware device communicates the first data to the second network hardware device over a fourth wireless connection between the third network hardware device and the second network hardware device. In some embodiments, the network hardware device is a first mesh network device of a WMN, the second network hardware device is a WWAN device of a WWAN. The third network hardware device is a second mesh network device of a WMN. The third wireless connection described above may be a P2P wireless connection that is part of the network backbone of the WMN. In other embodiments, the first and third network hardware devices may be connected in another type of network than a WMN.

In a further embodiment, the processing device determines that the second radio is no longer communicating the second data to the client device and communicates the first data to the second network hardware using the first radio when the second radio is not communicating the second data to the client device. In another embodiment, the processing device determines that the third network hardware device is communicating with a second client device in the second frequency range, and determines that a fourth network hardware device is not communicating with a third client device in the second frequency range. While the second data is communicated to the client device over the second wireless connection, the processing device communicates the first data to the fourth network hardware device over a fifth wireless connection, instead of the first wireless connection or the third wireless connection. The fourth network hardware device communicates the first data to the second network hardware device over a sixth wireless connection between the fourth network hardware device and the second network hardware device.

In another embodiment, the first radio is a WWAN radio that communicates the first data as WWAN data over a WWAN connection to the second network device in the first frequency range. The second radio is a first WLAN radio that communicates the second data as first WLAN data over a first WLAN connection to the client device in the second frequency range. The third radio is a second WLAN radio that communicates the third data as second WLAN data over a second WLAN connection with the third network hardware device in the third frequency range. In one embodiment, the WWAN radio is an LTE radio and the first frequency is the LTE band 40 at 2.4 GHz or the LTE band 7 at 2.5 GHz and the second frequency range is the WLAN 2.4 GHz band. The third frequency range may be the WLAN 5 GHz band. In some cases, the second radio and the third radio are part of a dual-band WLAN radio.

In a further embodiment, the processing device determines the condition of simultaneous operation by the WWAN radio and the WLAN radio operating in close frequency ranges. The processing device can determine the condition by detecting a request for data through the WWAN connection. The processing device sends a coexistence reconfiguration request to a MNCS over the WWAN connection. The MNCS selects the third network hardware device as one of the network hardware devices in the WMN that is not serving a client device in the second frequency range. The processing device receives a response from the MNSC instructing the processing device to send the WWAN data to the WWAN device through the second mesh network device, instead of through the WWAN connection. The second mesh network device has a second WWAN connection with the WWAN device to obtain the data requested. While the second data is communicated to the client device over the second WLAN connection, the processing device communicates the WWAN data over the second WLAN connection in the third frequency range using the second WLAN radio. In another embodiment, the processing device sends a coexistence reconfiguration request to the second mesh network device directly to establish a new connection or use an already existing WWAN connection. The second mesh network device can forward any data received over its WWAN connection to the mesh network device. In another embodiment, the processing device can use cooperative or pseudo-cooperative network techniques to route the WWAN connection to a mesh network device that is not serving a client consumption device on the WLAN connection. As described herein, the first frequency range may be the LTE band 40 at 2.4 GHz or the LTE band 7 at 2.5 GHz, the second frequency range may be the WLAN 2.4 GHz band, and the third frequency range may be the WLAN 5 GHz band.

The second WLAN radio of the network hardware device may include a first WLAN channel for the P2P wireless connection with the second mesh network device and a second WLAN channel for a second P2P wireless connection between the mesh network device and a third mesh network device. The network hardware device may include additional radios and additional antennas. In one embodiment, the network hardware device includes a third WLAN radio that communicates the third data as third WLAN data over a third WLAN connection with a fourth network hardware device in the third frequency range. Like above, the network hardware device, third hardware device, and fourth network hardware device may be mesh network devices in a WMN and the second network hardware device is a WWAN device of a WWAN, such as a cell tower in a cellular network. The third wireless connection and the third WLAN connection may be P2P wireless connections that are part of a network backbone of the WMN. The processing device can determine a second condition that the second mesh network device begins communicating with a second client consumption device. The processing device sends a second coexistence reconfiguration request to the MNCS. The MNSC selects the third mesh network device as one of the network hardware devices in the WMN that is not serving a client device in the second frequency range. The processing device receives a second response from the MNSC instructing the mesh network device to send the WWAN data to the WWAN device through the third mesh network device, instead of through the WWAN connection. The third mesh network device has a third WWAN connection with the WWAN device to communicate the requested data. While the second data is communicated to the client device over the second WLAN connection, the processing device communicates the WWAN data over the third WLAN connection in the third frequency range using the third WLAN radio. In this embodiment, multiple radios can be used to coordinate the communications. Alternatively, a dual-band radio can use different wireless channels to coordination the communications. For example, in one embodiment, the second WLAN radio includes a first WLAN channel and a second WLAN channel. The second WLAN radio communicates the third data over the first WLAN channel with the second mesh network device in the third frequency range. The second WLAN radio communicates the third data over the second WLAN channel with a third mesh network device in the WMN in the third frequency range. The processing device determines a second condition that the second mesh network device begins communicating with a second client consumption device. The processing device sends a second coexistence reconfiguration request to the MNCS. The MNCS selects the third mesh network device as one of the network hardware devices in the WMN that is not serving a client device in the second frequency range. The processing device receives a second response from the MNSC instructing the mesh network device to send the WWAN data to the WWAN device through the third mesh network device, instead of through the WWAN connection. The third mesh network device has a third WWAN connection with the WWAN device. While the second data is communicated to the client device over the second WLAN connection, the processing device communicates the WWAN data over the second WLAN channel in the third frequency range using the second WLAN radio.

In another embodiment, a mesh network device includes an application processor that processes data signals in connection with communicating with other mesh network devices and client consumption devices in a WMN. The application processor may be a SoC as described herein. The mesh network device includes a WWAN radio, a first WLAN radio, and a second WLAN radio, as described herein. Each of the radios is coupled to the application processor. The application processor can monitor for a request for data through a WWAN connection of the WWAN radio. The application processor determines that the first WLAN radio is communicating with a first client consumption device and sends a reconfiguration request to a MNCS hosted by a cloud computing system, as described herein. The MNCS makes a selection of a second mesh network device in the WMN that is not servicing a client consumption device. This second mesh network device comprises a second WWAN radio. The application processor receives a response from the MNCS with the selection of the second mesh network device. The processing device communicates WLAN data to the first client consumption device using the first WLAN radio and communicates WWAN data to second mesh network device that causes the second mesh network device to communication the data with the second WWAN radio. The WLAN data is communicated concurrently with the WLAN data.

In a further embodiment, the WWAN radio causes the WWAN antenna to radiate electromagnetic energy in a first frequency range. The first WLAN radio causes the first WLAN antenna to radiate electromagnetic energy in a second frequency range and the second WLAN radio causes the second WLAN antenna to radiate electromagnetic energy in a third frequency range. As described herein, a first frequency separation between the first frequency range and the second frequency range is less than 100 MHz and a second frequency separation between the first frequency range and the third frequency range is equal to or greater than 100 MHz.

FIG. 8 illustrates a multi-radio, multi-channel (MRMC) network device 800 according to one embodiment. The MRMC network 800 includes a metal housing 802 that has eight sectors 804-818. Each of the eight sectors 804-818 has a truncated pyramid structure with a top portion and four side portions that define a recessed region of the respective truncated pyramid structure. The truncated pyramid structures are disposed on their sides in a horizontal plane and arranged in a circular arraignment with two adjacent sectors sharing at least one common side portion. The truncated pyramid structure may form an octagonal prism for the metal housing 802. The top portion and the four side portions may be metal surfaces or have portions of metal. Also, the outer top surfaces of the eight sectors form an inner chamber 811 in a center of the metal housing 802. In particular, the sector 808 may be considered a reflective chamber that includes an top portion 830, a first side portion 832, a second side portion 834, a third side portion 836, and a fourth side portion 838. The other sectors 804, 806, 810, 812, 814, 816, and 818 may have similar metal portions or surfaces as reflective chambers as the sector 808. Similarly, the inner chamber 811 can be considered reflective. For example, the circuit board 811 includes a metal ground plane that is a reflective surface for the top antenna, as well as for the bottom antenna. The opposite sides of the metal surfaces of the reflective chambers also are reflective for the top and bottom antennas.

In the depicted embodiment, the MRMC network 800 includes a circuit board 820 disposed within the metal housing 802. In particular, the circuit board 820 may include multiple portions, such as a first portion disposed in the inner chamber 811. There may be a second portion of the circuit board 820 disposed within a first sector 804 and a third portion of the circuit board 820 disposed within a second sector 806. These portions may extend to an outer side of the metal housing 802. The circuit board 820 may also include smaller portions that are disposed in the other sectors 808-818 to accommodate some of the antenna pairs disposed within the respective sectors.

In the depicted embodiment, the MRMC network 800 includes eight pairs of antennas 840, each pair being disposed in one of the eight sectors 804-818. Each pair includes a horizontal orientation antenna and a vertical orientation antenna. The eight pairs of antennas 840 may be disposed on, above, or below corresponding sections of the circuit board 820. In one embodiment, each of the eight pairs of antennas 840 is a pair of cross polarized dipole antennas, a pair of vertical polarized dipole antennas, or a pair of cross polarized patch antennas, as described below with respect to FIGS. 9-11.

In some embodiments, the MRMC network 800 includes a top antenna disposed on a top side of the circuit board 820 within the inner chamber 811 and a bottom antenna disposed on a bottom side of the circuit board 820 within the inner chamber 811. In the depicted embodiment, top antennas 842, 844 are disposed above the circuit board 820, and bottom antennas 846, 848 are disposed below the circuit board 820. The top antennas 842, 844 and the bottom antennas 846, 848 are helix coil antennas. In other embodiments, the top and bottom antennas may be other types of antennas, such as patch antennas, monopoles, dipoles, loops, folded monopoles, or the like.

In the depicted embodiment, the eight pairs of antennas 840, the top antennas 842, 844, and the bottom antennas 846, 848 are design to radiate electromagnetic energy in a first frequency range, such as the 5 GHz band of the Wi-Fi® technologies. The metal of the top portion and the four side portions of each of the eight sectors operate as a reflector chamber. For example, the metal of the top portion 830 and the four side portions 832-838 of the sector 808 operate as a reflector chamber for the pair of antennas 840 within the respective chamber. The reflective chamber reflects the electromagnetic energy, radiated by the horizontal orientation antenna, in a first directional radiation pattern with high gain in a direction along a center axis of the sector 808 (e.g., a truncated pyramid structure) and reflects the electromagnetic energy, radiated by the vertical orientation antenna, in a second directional radiation pattern with high gain in the direction along the center axis of the sector 808. The gain the first direction is considered higher than the gain in other directions, such as an opposite direction than the first direction. The number of metal surfaces may impact the gain in the first direction. As few as one metal surface can be used to reflect the electromagnetic energy. However, if more than three metal surfaces, the gain in the first direction can be increased.

In the depicted embodiment, the MRMC network 800 includes a first omni-directional antenna 850 (e.g., dual-band WLAN antenna) disposed on the top side of the second portion of the circuit board 820 disposed within the sector 804 (i.e., a first of the eight sectors). In a further embodiment, a second omni-directional antenna 852 is disposed on the top side of the third portion of the circuit board 820 disposed within the sector 806 (i.e., a second of the eight sectors). The first omni-directional antenna 850 and the second omni-directional antenna 852 are designed to radiate electromagnetic energy in the first frequency range (e.g., 5 GHz band) and a second frequency range (e.g., 2.4 GHz band).

In the depicted embodiment, the MRMC network 800 includes a first cellular antenna 854 (e.g., WWAN antenna) disposed on the top side of the second portion of the circuit board 820 disposed within the sector 804 (i.e., a first of the eight sectors). In a further embodiment, a second cellular antenna 856 is disposed on the top side of the third portion of the circuit board 820 disposed within the sector 806 (i.e., a second of the eight sectors). The first cellular antenna 854 and the second cellular antenna 856 are designed to radiate electromagnetic energy in a third frequency range. For examples, the third frequency range may be the 900 MHz band for the 2G specification, the 1800 MHz band for the 2G specification, the B1 band for the 3G specification, the B8 band for the 3G specification, or the B40 band for the LTE specification.

In the depicted embodiment, the MRMC network 800 includes a first RF radio (not illustrated in FIG. 8) disposed on the circuit board 820 and coupled to the first cellular antenna 854 and the second cellular antenna 856. The first RF radio causes the first cellular antenna 854, the second cellular antenna 856, or both to radiate the electromagnetic energy in the third frequency range. In a further embodiment, multiple RF radios (not illustrated in FIG. 8) are disposed on the circuit board 820 and coupled to the eight pairs of antennas 840, the top antennas 842, 844, and the bottom antennas 846, 848. The RF radios cause different combinations of one or more of the eight pairs of antennas 840, the top antennas 842, 844, and the bottom antennas 846, 848 to radiate the electromagnetic energy in the first frequency range (e.g., 2.4 GHz band). In a further embodiment, a second RF radio (not illustrated in FIG. 8) is disposed on the circuit board 820 and coupled to the first omni-directional antenna 850 and the second omni-directional antenna 852. The second RF radio cause the first omni-directional antenna 850, the second omni-directional antenna 852, or both to radiate the electromagnetic energy in the first frequency range (e.g., 5 GHz band).

In the depicted embodiment, the MRMC network 800 includes a third RF radio (not illustrated in FIG. 8) disposed on the circuit board 820 and coupled to the first omni-directional antenna 850 and the second omni-directional antenna 852. The second RF radio cause the first omni-directional antenna 850, the second omni-directional antenna 852, or both to radiate the electromagnetic energy in the second frequency range (e.g., 2.4 GHz band).

FIG. 9 is a block diagram of a network hardware device 900 according to one embodiment. The network hardware device 900 may correspond to the network hardware device 102-110 of FIG. 1. In another embodiment, the network hardware device 900 may correspond to the network hardware devices 202-210 in FIG. 2. In another embodiment, the network hardware device 900 may correspond to the mesh node 300 of FIG. 3. Alternatively, the network hardware device 900 may be other electronic devices, as described herein.

The network hardware device 900 includes one or more processor(s) 930, such as one or more CPUs, microcontrollers, field programmable gate arrays, or other types of processors. The network hardware device 900 also includes system memory 906, which may correspond to any combination of volatile and/or non-volatile storage mechanisms. The system memory 906 stores information that provides operating system component 908, various program modules 910, program data 912, and/or other components. In one embodiment, the system memory 906 stores instructions of methods to control operation of the network hardware device 900. The network hardware device 900 performs functions by using the processor(s) 930 to execute instructions provided by the system memory 906.

The network hardware device 900 also includes a data storage device 914 that may be composed of one or more types of removable storage and/or one or more types of non-removable storage. The data storage device 914 includes a computer-readable storage medium 916 on which is stored one or more sets of instructions embodying any of the methodologies or functions described herein. Instructions for the program modules 910 may reside, completely or at least partially, within the computer-readable storage medium 916, system memory 906 and/or within the processor(s) 930 during execution thereof by the network hardware device 900, the system memory 906 and the processor(s) 930 also constituting computer-readable media. The network hardware device 900 may also include one or more input devices 918 (keyboard, mouse device, specialized selection keys, etc.) and one or more output devices 920 (displays, printers, audio output mechanisms, etc.).

The network hardware device 900 further includes a modem 922 to allow the network hardware device 900 to communicate via a wireless connections (e.g., such as provided by the wireless communication system) with other computing devices, such as remote computers, an item providing system, and so forth. The modem 922 can be connected to one or more RF modules 986. The RF modules 986 may be a WLAN module, a WAN module, PAN module, GPS module, or the like. The antenna structures (antenna(s) 984, 985, 987) are coupled to the RF circuitry 983, which is coupled to the modem 922. The RF circuitry 983 may include radio front-end circuitry, antenna switching circuitry, impedance matching circuitry, or the like. The antennas 984 may be GPS antennas, NFC antennas, other WAN antennas, WLAN or PAN antennas, or the like. The modem 922 allows the network hardware device 900 to handle both voice and non-voice communications (such as communications for text messages, multimedia messages, media downloads, web browsing, etc.) with a wireless communication system. The modem 922 may provide network connectivity using any type of mobile network technology including, for example, cellular digital packet data (CDPD), general packet radio service (GPRS), EDGE, universal mobile telecommunications system (UMTS), 1 times radio transmission technology (1×RTT), evaluation data optimized (EVDO), high-speed down-link packet access (HSDPA), Long Term Evolution (LTE) and LTE Advanced (sometimes generally referred to as 4G), etc.

The modem 922 may generate signals and send these signals to antenna(s) 984 of a first type (e.g., WLAN 5 GHz), antenna(s) 985 of a second type (e.g., WLAN 2.4 GHz), and/or antenna(s) 987 of a third type (e.g., WAN), via RF circuitry 983, and RF module(s) 986 as descried herein. Antennas 984, 985, 987 may be configured to transmit in different frequency bands and/or using different wireless communication protocols. The antennas 984, 985, 987 may be directional, omnidirectional, or non-directional antennas. In addition to sending data, antennas 984, 985, 987 may also receive data, which is sent to appropriate RF modules connected to the antennas. One of the antennas 984, 985, 987 may be any combination of the antenna structures described herein.

In one embodiment, the network hardware device 900 establishes a first connection using a first wireless communication protocol, and a second connection using a different wireless communication protocol. The first wireless connection and second wireless connection may be active concurrently, for example, if a network hardware device is receiving a media item from another network hardware device (e.g., a mini-POP node) via the first connection) and transferring a file to another user device (e.g., via the second connection) at the same time. Alternatively, the two connections may be active concurrently during wireless communications with multiple devices. In one embodiment, the first wireless connection is associated with a first resonant mode of an antenna structure that operates at a first frequency band and the second wireless connection is associated with a second resonant mode of the antenna structure that operates at a second frequency band. In another embodiment, the first wireless connection is associated with a first antenna structure and the second wireless connection is associated with a second antenna. In other embodiments, the first wireless connection may be associated with content distribution within mesh nodes of the WMN and the second wireless connection may be associated with serving a content file to a client consumption device, as described herein.

Though a modem 922 is shown to control transmission and reception via antenna (984, 985, 987), the network hardware device 900 may alternatively include multiple modems, each of which is configured to transmit/receive data via a different antenna and/or wireless transmission protocol.

In the above description, numerous details are set forth. It will be apparent, however, to one of ordinary skill in the art having the benefit of this disclosure, that embodiments may be practiced without these specific details. In some instances, well-known structures and devices are shown in block diagram form, rather than in detail, in order to avoid obscuring the description.

Some portions of the detailed description are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers or the like.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "inducing," "parasitically inducing," "radiating," "detecting," "determining," "generating," "communicating," "receiving," "disabling," or the like, refer to the actions and processes of a computer system, or similar electronic computing device, that manipulates and transforms data represented as physical (e.g., electronic) quantities within the computer system's registers and memories into other data similarly represented as physical quantities within the computer system memories or registers or other such information storage, transmission or display devices.

Embodiments also relate to an apparatus for performing the operations herein. This apparatus may be specially constructed for the required purposes, or it may comprise a general-purpose computer selectively activated or reconfigured by a computer program stored in the computer. Such a computer program may be stored in a computer readable storage medium, such as, but not limited to, any type of disk including floppy disks, optical disks, CD-ROMs and magnetic-optical disks, read-only memories (ROMs), random access memories (RAMs), EPROMs, EEPROMs, magnetic or optical cards, or any type of media suitable for storing electronic instructions.

The algorithms and displays presented herein are not inherently related to any particular computer or other apparatus. Various general-purpose systems may be used with programs in accordance with the teachings herein, or it may prove convenient to construct a more specialized apparatus to perform the required method steps. The required structure for a variety of these systems will appear from the description below. In addition, the present embodiments are not described with reference to any particular programming language. It will be appreciated that a variety of programming languages may be used to implement the teachings of the present invention as described herein. It should also be noted that the terms "when" or the phrase "in response to," as used herein, should be understood to indicate that there may be intervening time, intervening events, or both before the identified operation is performed.

It is to be understood that the above description is intended to be illustrative, and not restrictive. Many other embodiments will be apparent to those of skill in the art upon reading and understanding the above description. The scope of the present embodiments should, therefore, be determined with reference to the appended claims, along with the full scope of equivalents to which such claims are entitled.

What is claimed is:

1. A mesh network device in a wireless mesh network (WMN), the mesh network device comprising:
   a wireless wide area network (WWAN) antenna, a first wireless local area network (WLAN) antenna, and a second WLAN antenna;
   a processing device;
   a WWAN radio coupled to the WWAN antenna and the processing device, the WWAN radio to operate in a first frequency range;
   a first WLAN radio coupled to the first WLAN antenna and the processing device, the first WLAN radio to operate in a second frequency range, wherein a first frequency separation between the first frequency range and the second frequency range is less than 100 MHz;
   a second WLAN radio coupled to the second WLAN antenna and the processing device, the second WLAN radio to operate in a third frequency range, wherein a second frequency separation between the first frequency range and the third frequency range is greater than the 100 MHz; wherein the processing device is operable to:
      determine that the WWAN radio is communicating with a WWAN network device over a first WWAN connection in the first frequency range simultaneously while the first WLAN radio is communicating with a client consumption device in the second frequency range;
      use an alternate communication path between the WWAN network device and the mesh network device via a second mesh network device to create spatial separation for simultaneous WLAN communications and WWAN communications, wherein the alternate communication path comprises a first peer-to-peer (P2P) wireless connection between the mesh network device and the second mesh network device and a second WWAN connection between the WWAN network device and the second mesh network device;
      cease communication with the WWAN network device using the first WWAN connection; and
      communicate with the WWAN network device using the second WLAN radio through the alternate communication path while the first WLAN radio is simultaneously communicating with the client consumption device.

2. The mesh network device of claim 1, wherein the second WLAN radio comprises:
   a first WLAN channel for the first P2P wireless connection with the second mesh network device; and
   a second WLAN channel for a second P2P wireless connection between the mesh network device and a third mesh network device.

3. The mesh network device of claim 1, wherein the processing device is operable to:
   determine that the second mesh network device is communicating with a second client consumption device over a second N2C wireless connection;
   use a second alternate communication path between the WWAN network device and the mesh network device, wherein the second alternate communication path comprises a second P2P wireless connection between the mesh network device and a third mesh network device and a third WWAN connection between the WWAN network device and the third mesh network device;
cease communication with the WWAN network device using the second WLAN radio through the alternate communication path; and
communicate with the WWAN network device using the second WLAN radio through the second alternate communication path while the first WLAN radio is simultaneously communicating with the client consumption device.

4. A network hardware device comprising:
a processing device;
a first radio coupled to a first antenna and the processing device, the first radio to communicate first data over a first wireless connection between the network hardware device and a second network hardware device in a first frequency range;
a second radio coupled to a second antenna and the processing device, the second radio to communicate second data over a second wireless connection between the network hardware device and a client device in a second frequency range, wherein a first frequency separation between the first frequency range and the second frequency range is less than 100 MHz; and
a third radio coupled to a third antenna and the processing device, the third radio to communicate third data over a third wireless connection between the network hardware device and a third network hardware device in a third frequency range, wherein a second frequency separation between the first frequency range and the third frequency range is equal to or greater than the 100 MHz, and wherein the processing device is operable to:
determine that the first radio and the second radio are communicating the first data and the second data simultaneously over the first wireless connection and the second wireless connection, respectively;
communicate the second data to the client device over the second wireless connection; and
while the second data is communicated to the client device over the second wireless connection, (i) cease communication over the first wireless connection and (ii) communicate the first data to the third network hardware device over the third wireless connection.

5. The network hardware device of claim 4, wherein the third network hardware device communicates the first data to the second network hardware device over a fourth wireless connection between the third network hardware device and the second network hardware device.

6. The network hardware device of claim 4, wherein the network hardware device is a first mesh network device of a wireless mesh network (WMN), wherein the second network hardware device is a wireless wide area network (WWAN) device, wherein the third network hardware device is a second mesh network device of a WMN, wherein the third wireless connection is a peer-to-peer (P2P) wireless connection between the first mesh network device and the second mesh network device, wherein the P2P wireless connection is part of a network backbone of the WMN.

7. The network hardware device of claim 4, wherein the processing device is further operable to:
determine that the second radio is no longer communicating the second data to the client device; and
communicate the first data to the second network hardware using the first radio when the second radio is not communicating the second data to the client device.

8. The network hardware device of claim 4, wherein the processing device is further operable to:
determine that the third network hardware device is communicating with a second client device in the second frequency range;
determine that a fourth network hardware device is not communicating with a third client device in the second frequency range; and
while the second data is communicated to the client device over the second wireless connection, (i) cease communication over the third wireless connection and (ii) communicate the first data to the fourth network hardware device over a fifth wireless connection, wherein the fourth network hardware device communicates the first data to the second network hardware device over a sixth wireless connection between the fourth network hardware device and the second network hardware device.

9. The network hardware device of claim 4, wherein the first radio is a wireless wide area network (WWAN) radio to communicate the first data as WWAN data over a WWAN connection to the second network hardware device in the first frequency range, wherein the second radio is a first wireless local area network (WLAN) radio to communicate the second data as first WLAN data over a first WLAN connection to the client device in the second frequency range, wherein the third radio is a second WLAN radio to communicate the third data as second WLAN data over a second WLAN connection with the third network hardware device in the third frequency range.

10. The network hardware device of claim 9, wherein the WWAN radio is an LTE radio and the first frequency is the LTE band 40 at 2.4 GHz or the LTE band 7 at 2.5 GHz, wherein the second frequency range is the WLAN 2.4 GHz band, wherein the third frequency range is the WLAN 5 GHz band, wherein the second radio and the third radio are part of a dual-band WLAN radio.

11. The network hardware device of claim 9, wherein the network hardware device is a first mesh network device of a wireless mesh network (WMN), wherein the second network hardware device is a WWAN device, wherein the third network hardware device is a second mesh network device, wherein the third wireless connection is a peer-to-peer (P2P) wireless connection between the first mesh network device and the second mesh network device, wherein the P2P wireless connection is part of a network backbone of the WMN, and wherein the processing device is further operable to:
detecting a request for data through the WWAN connection while the first radio and the second radio are communicating the first data and the second data simultaneously over the first wireless connection and the second wireless connection, respectively;
send a coexistence reconfiguration request to a mesh network control service (MNCS) over the WWAN connection, wherein the MNCS selects the second mesh network device as one of a plurality of network hardware devices in the WMN that is not serving a client device in the second frequency range;
receiving a response from the MNCS instructing the first mesh network device to communicate with the WWAN device through the second mesh network device, wherein the second mesh network device has a second WWAN connection with the WWAN device; and
while the second data is communicated to the client device over the second WLAN connection, (i) cease communication over the WWAN connection and (ii)

communicate the WWAN data over the P2P wireless connection to the second mesh network device to be communicated over the second WWAN connection to the WWAN device.

12. The network hardware device of claim 11, wherein the first frequency range comprises LTE, wherein the second frequency range is the WLAN 2.4 GHz band, and wherein the third frequency range is the WLAN 5 GHz band.

13. The network hardware device of claim 11, wherein the second WLAN radio comprises:
   a first WLAN channel for the P2P wireless connection with the second mesh network device; and
   a second WLAN channel for a second P2P wireless connection between the first mesh network device and a third mesh network device.

14. The network hardware device of claim 9, further comprising a third WLAN radio to communicate the third data as third WLAN data over a third WLAN connection with a fourth network hardware device in the third frequency range, wherein the network hardware device is a first mesh network device of a wireless mesh network (WMN), wherein the second network hardware device is a WWAN device, wherein the third network hardware device is a second mesh network device of the WMN, wherein the fourth network hardware device is a third mesh network device of the WMN, wherein the third wireless connection is a first peer-to-peer (P2P) wireless connection and the third WLAN connection is a second P2P wireless connection, the first P2P wireless connection and the second P2P wireless connection being part of a network backbone of the WMN, and wherein the processing device is further operable to:
   determine that the second mesh network device begins communicating with a second client consumption device;
   send a second coexistence reconfiguration request to a mesh network control service (MNCS), wherein the MNCS selects the third mesh network device as one of a plurality of network hardware devices in the WMN that is not serving a client device in the second frequency range;
   receiving a second response from the MNCS instructing the first mesh network device to communicate with the WWAN device through the third mesh network device, wherein the third mesh network device has a third WWAN connection with the WWAN device; and
   while the second data is communicated to the client device over the second WLAN connection, (i) cease communication over the first P2P wireless connection and (ii) communicate the WWAN data over the second P2P wireless connection in the third frequency range using the third WLAN radio.

15. The network hardware device of claim 9, wherein the network hardware device is a first mesh network device of a wireless mesh network (WMN), wherein the second network hardware device is a WWAN device, wherein the third network hardware device is a second mesh network device, wherein the second WLAN radio comprises a first WLAN channel and a second WLAN channel, wherein the second WLAN radio is to communicate the third data over the first WLAN channel with the second mesh network device in the third frequency range, wherein the second WLAN radio is to communicate the third data over the second WLAN channel with a third mesh network device in the WMN in the third frequency range, and wherein the processing device is further operable to:

determine that the second mesh network device begins communicating with a second client consumption device;
send a second coexistence reconfiguration request to a mesh network control service (MNCS), wherein the MNCS selects the third mesh network device as one of the plurality of network hardware devices in the WMN that is not serving a client device in the second frequency range;
receiving a second response from the MNCS instructing the first mesh network device to communicate with the WWAN device through the third mesh network device, wherein the third mesh network device has a third WWAN connection with the WWAN device; and
while the second data is communicated to the client device over the second WLAN connection, (i) cease communication over the first WLAN channel and (ii) communicate the WWAN data over the second WLAN channel.

16. The network hardware device of claim 9, wherein the network hardware device is a first mesh network device of a wireless mesh network (WMN), wherein the second network hardware device is a WWAN device, wherein the third network hardware device is a second mesh network device, wherein the third wireless connection is a peer-to-peer (P2P) wireless connection between the first mesh network device and the second mesh network device, wherein the P2P wireless connection is part of a network backbone of the WMN, and wherein the processing device is further operable to:
   detecting a request for data through the WWAN connection while the first radio and the second radio are communicating the first data and the second data simultaneously over the first wireless connection and the second wireless connection, respectively;
   send a coexistence reconfiguration request to the second mesh network device, the coexistence reconfiguration request to instruct the second mesh network device to communicate with the WWAN through a second WWAN connection with the WWAN device on behalf of the first mesh network device;
   receiving a response from the second mesh network device that second mesh network device is to communicate with the WWAN device; and
   while the second data is communicated to the client device over the second WLAN connection, (i) cease communication over the WWAN connection and (ii) communicate the WWAN data over the P2P wireless connection to the second mesh network device to be communicated over the second WWAN connection to the WWAN device.

17. The network hardware device of claim 4, wherein the first frequency range is the LTE band 40 at 2.4 GHz or the LTE band 7 at 2.5 GHz, wherein the second frequency range is the WLAN 2.4 GHz band, and wherein the third frequency range is the WLAN 5 GHz band.

18. The network hardware device of claim 4, wherein the second antenna and the third antenna are the same antenna.

19. The network hardware device of claim 4, wherein the second radio and the third radio are the same radio.

20. A mesh network device comprising:
   an application processor to process data signals in connection with communicating with other mesh network devices and client consumption devices in a wireless mesh network (WMN);

a wireless wide area network (WWAN) radio coupled to the application processor and coupled to a WWAN antenna;
a first wireless local area network (WLAN) radio coupled to the application processor and coupled to a first WLAN antenna;
a second WLAN radio coupled to the application processor and coupled to a second WLAN antenna, wherein the application processor is operable to:
monitor for a request for data through a WWAN connection by the WWAN radio;
determine that the first WLAN radio is communicating with a first client consumption device;
send a reconfiguration request to a mesh network control service (MNCS) hosted by a cloud computing system, wherein the MNCS selects a second mesh network device in the WMN that is not servicing a client consumption device, wherein the second mesh network device comprises a second WWAN radio;
receive a response from the MNCS with a selection of the second mesh network device;
while communicating WLAN data to the first client consumption device using the first WLAN radio:
cease communication over the WWAN connection; and
communicate WWAN data to second mesh network device over a peer-to-peer (P2P) connection that causes the second mesh network device to communicate the data with the second WWAN radio over a second WWAN connection.

21. The mesh network device of claim 20, wherein the WWAN radio causes the WWAN antenna to radiate electromagnetic energy in a first frequency range, wherein the first WLAN radio causes the first WLAN antenna to radiate electromagnetic energy in a second frequency range, and wherein the second WLAN radio causes the second WLAN antenna to radiate electromagnetic energy in a third frequency range.

22. The mesh network device of claim 21, wherein a first frequency separation between the first frequency range and the second frequency range is less than 100 MHz and a second frequency separation between the first frequency range and the third frequency range is equal to or greater than 100 MHz.

* * * * *